United States Patent
Shimizu et al.

(10) Patent No.: US 6,908,388 B2
(45) Date of Patent: Jun. 21, 2005

(54) GAME SYSTEM WITH TILT SENSOR AND GAME PROGRAM INCLUDING VIEWPOINT DIRECTION CHANGING FEATURE

(75) Inventors: Takao Shimizu, Kyoto (JP); Toshiaki Suzuki, Kyoto (JP)

(73) Assignee: Nintendo Co., Ltd., Kyoto (JP)

(*) Notice: Subject to any disclaimer, the term of this patent is extended or adjusted under 35 U.S.C. 154(b) by 0 days.

(21) Appl. No.: 10/440,111

(22) Filed: May 19, 2003

(65) Prior Publication Data

US 2003/0216176 A1 Nov. 20, 2003

(30) Foreign Application Priority Data

May 20, 2002 (JP) ........................................ 2002-144005

(51) Int. Cl.[7] .................................................. A63F 9/24
(52) U.S. Cl. .......................................... 463/31; 463/43
(58) Field of Search ............................. 413/30, 31, 32, 413/33, 34, 36–38, 46–47

(56) References Cited

U.S. PATENT DOCUMENTS 5,853,324 A * 12/1998 Kami et al. .................... 463/2
6,375,572 B1 * 4/2002 Masuyama et al. ........... 463/43
2003/0040349 A1 * 2/2003 Imaeda et al. ................. 463/3

FOREIGN PATENT DOCUMENTS

JP         2001-170358         6/2001

* cited by examiner

Primary Examiner—Kim Nguyen
(74) Attorney, Agent, or Firm—Nixon & Vanderhye P.C.

(57) ABSTRACT

A game system displaying a three-dimensional game space on a display includes a housing held by a player, a tilt sensor provided on the housing, a viewpoint coordinates determination mechanism for determining viewpoint coordinates in accordance with an output value of the tilt sensor, and a game image generation processing mechanism for generating a game image based on the viewpoint coordinates determined by the viewpoint coordinates determination mechanism. The game system allows the player to feel as if the three-dimensional game space is tilted in accordance with a tilt of a game device, etc., with a minimal processing burden.

31 Claims, 17 Drawing Sheets

F I G. 6
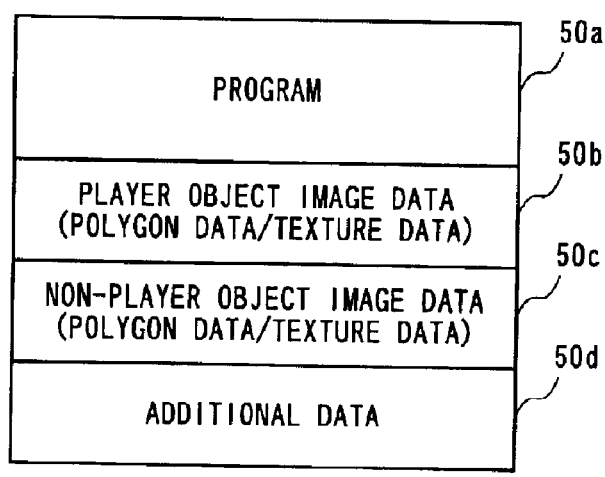

US 6,908,388 B2

GAME SYSTEM WITH TILT SENSOR AND GAME PROGRAM INCLUDING VIEWPOINT DIRECTION CHANGING FEATURE

FIELD OF THE INVENTION

The present invention relates to game systems and game programs using a tilt sensor. More particularly, the present invention relates to a game system and a game program changing a three-dimensional game image in accordance with an output of the tilt sensor.

BACKGROUND AND SUMMARY OF THE INVENTION

Japanese Patent Laid-Open Publication No. 2001-170358 discloses a game system (hereinafter, referred to as "a conventional technique") using a tilt sensor. In this conventional technique, when a handheld game device or a game controller (hereinafter, referred to as "a game device, etc." in place of "a handheld game device or a game controller") is tilted, a game image is generated in which an object such as a player character, etc., moves (rolls over) in the direction of tilt, thereby allowing a player to feel as if a game space is actually tilted in accordance with a tilt of the game device, etc.

The above described conventional technique, however, is used for controlling a two-dimensional game image, and cannot be adapted to a three-dimensional game image which has become prevalent as a game image.

SUMMARY OF THE INVENTION

Therefore, an object of the present invention is to provide a game system and a game program allowing a player to feel as if a three-dimensional game space is tilted in accordance with a tilt of a game device, etc., with a minimal burden of processing.

The present exemplary embodiments have the following features to attain the object mentioned above. A first aspect of the exemplary embodiments is directed to a game system (a game system 30) displaying a three-dimensional game space on display means. The game system includes a housing (a housing 11 or a housing 91) held by a player, a tilt sensor (an acceleration sensor 154 or an acceleration sensor 93) provided on the housing, viewpoint coordinates determination means (a CPU 401 executing step S104) for determining viewpoint coordinates (viewpoint coordinates 106) in accordance with an output value of the tilt sensor, and game image generation means (the CPU 401 executing step S108) for generating a game image based on the viewpoint coordinates determined by the viewpoint coordinates determination means. The viewpoint coordinates determination means changes the viewpoint coordinates in accordance with the output value of the tilt sensor, thereby changing the game image in accordance with a tilt of the housing. For example, the viewpoint coordinates determination means moves the viewpoint coordinates in the same direction as that detected by the tilt sensor, or moves the viewpoint in an opposite direction. Alternatively, the viewpoint may be moved based on a predetermined rule even if the tilt direction does not coincide with a moving direction of the viewpoint.

According to a second aspect, the game system of the first aspect further includes basic viewpoint coordinates determination means (the CPU 401 executing step S1041) for determining basic viewpoint coordinates (basic viewpoint coordinates 105). The basic viewpoint coordinates determination means, for example, determines a position of the viewpoint in a predetermined direction (a Z-axis negative direction (diagonal direction) of an object coordinate system of a player object) at a predetermined distance (D1) from the player object. Note that the basic viewpoint coordinates may be a fixed position (as described above, a position in the Z-axis negative direction (diagonal direction) of the object coordinate system of the player object at the predetermined distance (D1) from the player object) with respect to a predetermined object (the player object), but the position of the basic viewpoint coordinates may be changed depending on the situation. For example, if there is an obstruction between the player object and the viewpoint, the viewpoint may be moved in a circular path. The tilt sensor detects a tilt in a predetermined direction (an X-axis direction or a Z-axis direction shown in FIG. 5) of the housing. Also, the viewpoint coordinates determination means determines a predetermined axis (an axis 108 or an axis 110) in accordance with the tilt direction detected by the tilt sensor, rotates the basic viewpoint coordinates (the basic viewpoint coordinates 105) determined by the basic viewpoint coordinates determination means in a direction opposite to the tilt direction about the predetermined axis, and determines the rotated coordinates (viewpoint coordinates 106) as the viewpoint coordinates (steps S1043 and S1045).

In the game system of the first aspect, a third aspect is directed to a process performed when the tilt sensor detects that the housing is tilted in a side-to-side direction (that is, tilted about the Z-axis shown in FIG. 5). Note that, in the present invention, the side-to-side direction is assumed to be a horizontal direction of the housing held by the player, and corresponds to the X-axis direction shown in FIG. 5, which will be described further below. When the tilt sensor detects the above-described tilt of the housing, the viewpoint coordinates determination means rotates the basic viewpoint coordinates (the basic viewpoint coordinates 105) in a direction opposite to the tilt direction about an axis (the axis 110), the axis is a Z-axis (an axis 120) of a viewpoint coordinate system projected onto an XZ plane of a world coordinate system, and determines (step S1043) the rotated coordinates (the viewpoint coordinates 106) as the viewpoint coordinates.

In the game system of the first aspect, a fourth aspect is directed to a process performed when the tilt sensor detects that the housing is tilted in a back-and-forth direction (that is, tilted about the X-axis shown in FIG. 5.). Note that, in the present invention, the back-and-forth direction is assumed to be a forward direction of the housing held by the player, and corresponds to the Z-axis direction shown in FIG. 5, which will be described further below. When the tilt sensor detects the above-described tilt of the housing, the viewpoint coordinates determination means rotates the basic viewpoint coordinates (the basic viewpoint coordinates 105) in a direction opposite to the tilt direction about an axis (the axis 108) orthogonal to a Z-axis of the viewpoint coordinate system projected onto an XZ plane of a world coordinate system, the axis exists in the XZ plane of the world coordinate system and passes through a sight point. The viewpoint coordinates determination means determines the rotated coordinates (the viewpoint coordinates 106) as the viewpoint coordinates (step S1045).

According to a fifth aspect, in the game system of any one of the second to fourth aspects, the viewpoint coordinates determination means rotates the basic viewpoint coordinates (the basic viewpoint coordinates 105) at the tilt angle (a tilt angle from a horizontal plane or a tilt angle from a basic position) detected by the tilt sensor in an opposite direction, and determines the rotated coordinates (the viewpoint coordinates 106) as the viewpoint coordinates (step S1043 or step S1045).

According to a sixth aspect, in the game system of the second aspect, the basic viewpoint coordinates determination means determines (step S1041) a position of the basic viewpoint coordinates in a fixed direction and/or at a fixed distance from a predetermined object (the player object). The basic viewpoint coordinates determination means, for example, determines a position of the basic viewpoint coordinates in a direction of the Z-axis negative direction (diagonal direction) of the local coordinate system of the player object at the predetermined distance (D1) from the predetermined object, that is, in a direction of an axis 111 at the predetermined distance (D1) from the predetermined object.

According to a seventh aspect, in the game system of the first aspect, basic position determination means (the CPU 401 executing step S2) for determining a basic position of the housing is further included. Also, the viewpoint coordinates determination means determines (step S1042, step S1044) the viewpoint coordinates (the viewpoint coordinates 106) in accordance with an amount of tilt with respect to the basic position. If the player holds the housing in the basic position, it is determined that the viewpoint is the basic coordinates (the basic viewpoint coordinates 105). Also, if the player holds the housing and tilts it in a predetermined direction from the basic position, it is determined that the viewpoint coordinates (the viewpoint coordinates 106) are the coordinates that are the basic coordinates rotated in a direction opposite to the tilt direction thereof. Here, the basic position is assumed to be a position where the tilt of the housing is 0 degrees, which is fixedly determined in advance in the game system, or determined arbitrarily by the player. If it is fixedly determined in advance in the game system, a horizontal position, for example, is determined as the basic position. If it is determined arbitrarily by the player, the basic position is determined by the player on a position that is suitable for holding the housing, the position allowing the player to easily view a game screen in the case of a handheld game device.

An eighth aspect is directed to a game program executed in a game system (a game system 30) displaying a three-dimensional game space on display means, the game system including a housing (a housing 11 or a housing 91) and a tilt sensor (an acceleration sensor 154 or an acceleration sensor 93) provided on the housing. The game program includes a viewpoint coordinates determining step (step S104) of determining viewpoint coordinates in accordance with an output value of the tilt sensor and a game image generating step (step S108) of generating a game image based on the viewpoint coordinates determined at the viewpoint coordinates determining step. Note that the above-described game program is typically stored in a computer-readable storage medium, and read therefrom by a computer for executing.

According to a ninth aspect, in the game program of the eighth aspect, a basic viewpoint coordinates determining step (step S1041) of determining basic viewpoint coordinates (the basic viewpoint coordinates 105) is further included. The basic viewpoint coordinates determining step, for example, determines a viewpoint in a predetermined direction (in the Z-axis negative direction (diagonal direction) of the local coordinate system of the player object) at a predetermined distance (D1) from the player object. Note that the basic viewpoint coordinates may be a fixed position (as described above, a position in the Z-axis negative direction (diagonal direction) of the local coordinate system of the player object at the predetermined distance (D1)) with respect to a predetermined object (the player object), but the position of the basic viewpoint coordinates may also be changed depending on the situation. For example, if there is an obstruction between the player object and the viewpoint, the viewpoint moves, for example, in a circular path. The tilt sensor detects a tilt in a predetermined direction (the X-axis direction or the Z-axis direction shown in FIG. 5) of the housing. Also, the viewpoint coordinates determining step determines a predetermined axis (the axis 108 or the axis 110) in accordance with the tilt direction detected by the tilt sensor, rotates the basic viewpoint coordinates (the basic viewpoint coordinates 105) determined by the basic viewpoint coordinates determination means in a direction opposite to the tilt direction about the predetermined axis, and determines the rotated coordinates (a viewpoint coordinates 106) as the viewpoint coordinates (step S1043 or step S1045).

In the game program of the ninth aspect, a tenth aspect is directed to a process performed when the tilt sensor detects that the housing is tilted in a side-to-side direction (that is, tilted about the Z-axis shown in FIG. 5). Note that, in the present invention, the side-to-side direction is assumed to be a horizontal direction of the housing held by the player, and corresponds to the X-axis direction shown in FIG. 5, which will be described further below. When the tilt sensor detects the above-described tilt of the housing, the viewpoint coordinates determining step rotates the basic viewpoint coordinates (the basic viewpoint coordinates 105) in a direction opposite to the tilt direction about an axis (the axis 110), the axis is the Z-axis (the axis 120) of a viewpoint coordinate system projected onto an XZ plane of a world coordinate system, and determines the rotated coordinates (the viewpoint coordinates 106) as the viewpoint coordinates (step S1043).

In the game program of the ninth aspect, an eleventh aspect is directed to a process performed when the tilt sensor detects that the housing is tilted in a back-and-forth direction (that is, tilted about the X-axis shown in FIG. 5.). Note that, in the present invention, the back-and-forth direction is assumed to be a forward direction of the housing held by the player, and corresponds to the Z-axis direction shown in FIG. 5, which will be described further below. When the tilt sensor detects the above-described tilt of the housing, the viewpoint coordinates determining step rotates the basic viewpoint coordinates (the basic viewpoint coordinates 105) in a direction opposite to the tilt direction about an axis (the axis 108) orthogonal to the Z-axis of the viewpoint coordinate system projected onto an XZ plane of a world coordinate system, the axis exists in the XZ plane of the world coordinate system and passes through a sight point. The viewpoint coordinates determining step determines the rotated coordinates (the viewpoint coordinates 106) as the viewpoint coordinates (step S1045).

According to a twelfth aspect, in the game program of any one of the ninth to eleventh aspects, the viewpoint coordinates determining step rotates the basic viewpoint coordinates (the basic viewpoint coordinates 105) at the tilt angle detected by the tilt sensor in an opposite direction, and determines the rotated coordinates (the viewpoint coordinates 106) as the viewpoint coordinates (step S1043 or step S1045).

According to a thirteenth aspect, in the game program of the ninth aspect, the basic viewpoint coordinates determining step determines (step S1041) a position of the basic viewpoint coordinates in a fixed direction and/or at a fixed distance from a predetermined object (the player object). The basic viewpoint coordinates determining step, for example, determines the basic viewpoint coordinates on a position in a direction of the Z-axis negative direction (diagonal direction) of the local coordinate system of the player object at the predetermined distance (D1) from the predetermined object, that is, the basic viewpoint coordinates is determined on the position in a direction of an axis 111 at the predetermined distance (D1) from the predetermined object.

According to a fourteenth aspect, in the game program of the eighth aspect, a basic position determining step (step S2) of determining a basic position of the housing is further included. Also, the viewpoint coordinates determining step determines (step S1042, step S1044) the viewpoint coordinates in accordance with an amount of tilt with respect to the basic position. If the player holds the housing in the basic position, it is determined that a viewpoint is the basic coordinates (the basic viewpoint coordinates 105). Also, if the player holds the housing and tilts it in a predetermined direction from the basic position, it is determined that the viewpoint coordinates (the viewpoint coordinates 106) are the coordinates that are the basic coordinates (the basic viewpoint coordinates 105) rotated in a direction opposite to the tilt direction thereof. Here, the basic position is a position where the tilt of the housing is assumed to be 0 degrees, which is fixedly determined in advance in the game system, or determined arbitrarily by the player. If it is fixedly determined in advance in the game system, a horizontal position, for example, is determined as the basic position. If it is determined arbitrarily by the player, the basic position is determined by the player on a position that is suitable for holding the housing, the position allowing the player to easily view a game screen in the case of a handheld game device.

Based on the above-described first or the eighth aspect, it is possible to allow the player to feel as if the three-dimensional game space is tilted in accordance with a tilt of a game device, etc., with a minimal burden of processing.

Based on the above-described second to fifth aspects, or the ninth to twelfth aspects, when the game device, etc., is tilted in a predetermined direction, the viewpoint is rotated in a direction opposite to the tilt direction, whereby it is possible to display an image allowing the player to experience a sensation of looking at the virtual game space existing in the game device, etc, from substantially the same direction as that of the real world. Especially, based on the fifth or the twelfth aspect, it is possible to display an image allowing the player to experience a sensation of looking at the game space from a predetermined direction of the real world. In general, it is necessary to convert game space data itself in order to tilt the game space. However, according to the present invention, it is possible to generate an image allowing the player to feel as if the game space is tilted by only changing the viewpoint, thereby reducing the burden of processing. Furthermore, in order to tilt the game space by converting the game space itself, it is necessary to tilt all the objects in the game space. According to the present invention, however, changing the viewpoint allows the tilt of all the objects to be displayed concurrently with tilting the game space without doing any additional processing.

Based on the above-described sixth or the thirteenth aspect, the basic viewpoint coordinates are fixedly determined with respect to the predetermined object. Thus, it is possible to enhance the accuracy of the tilt of the game space, which is tilted in accordance with the tilt of the game device, etc. In the case where the basic viewpoint coordinates are not fixed with respect to the predetermined object, and moved depending on the situation (for example, if there is an obstruction between the viewpoint and the predetermined object, the viewpoint is moved in a circular path to the right or left for avoiding the obstruction and viewing the predetermined object), it is difficult for the player to distinguish whether an image of the tilt of the game space is displayed or only the viewpoint is moved. According to the sixth or the thirteenth aspect, however, such an unnecessary confusion is not caused, thereby allowing the player to experience a sensation of tilting the game space concurrently with tilting the game device, etc.

Based on the above-described seventh or the fourteenth aspect, determination of the basic position allows the player to play the game in a position suitable for operation or in a position previously intended by a game developer.

These and other objects, features, aspects and advantages of the present invention will become more apparent from the following detailed description of the present invention when taken in conjunction with the accompanying drawings.

BRIEF DESCRIPTION OF THE DRAWINGS

FIG. 6 is an illustration showing data stored in a DVD-ROM 50;

DESCRIPTION OF THE PREFERRED EMBODIMENTS

Figure 1:
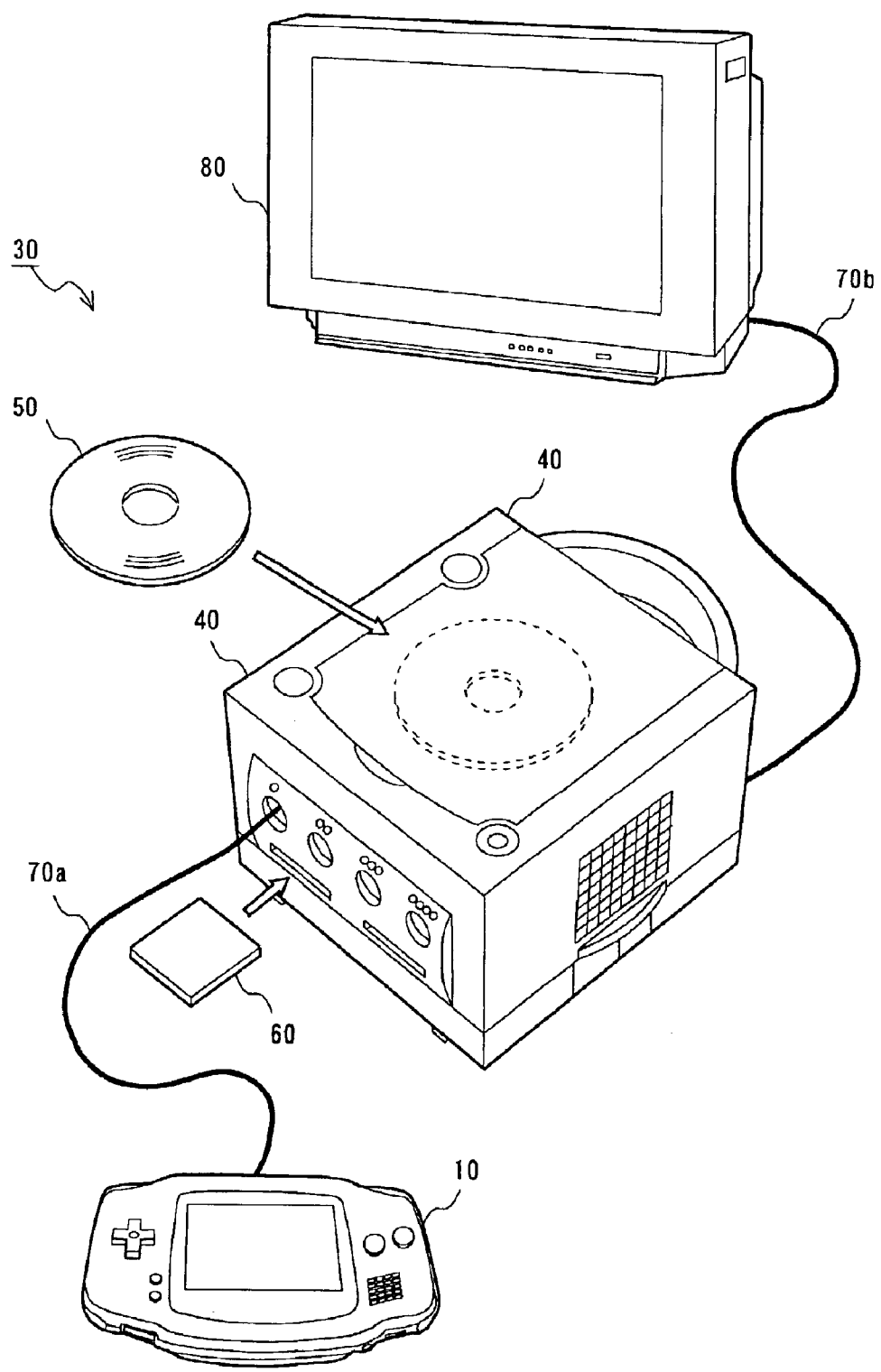
FIG. 1 is an external view of a game system 30 of an embodiment of the present invention.

FIG. 1 is an external view of a game system 30 of an embodiment of the present invention. The game system 30 includes a game device 40, a DVD-ROM 50, a memory card 60, and a game system 14 (including a handheld game device 10) shown in FIG. 2. Note that the memory card 60 is used selectively.

The DVD-ROM 50 and the memory card 60 can be removably mounted on and inserted into the game device 40, respectively. The game system 14 is connected to the game device 40 by a communication cable 70a, and a communication cable 70b connected to the game device 40 is connected to a television 80. The game device 40 has a plurality of connectors for connecting the game system 14 or a controller (not shown), and the game system 14 is connected to any one of the plurality of connectors. Note that communication between the game system 14 and the game device 40 may be performed wirelessly in place of the communication cable.

The DVD-ROM 50 fixedly stores a game program or image data necessary for execution of a game. The DVD-ROM 50 is mounted on the game device 40 when a player starts the game. The memory card 60 is a rewritable storage medium for storing the game progress during the game. Note that another storage medium (for example, a memory cartridge, or a CD-ROM, etc.) may be used in place of the DVD-ROM 50 for storing a game program, etc.

The game device 40 reads the game program stored in the DVD-ROM 50, and executes a game process. In the present embodiment, the game system 14 is used as a mere operation input device. Note that the handheld game device 10 (described below with reference to FIG. 2), which is included in the game system 14 and capable of independently executing the game process, may execute the game process in concert with the game device 40 while displaying a game screen on an LCD 12. However, in the present embodiment, descriptions about the above-described concerted game process are omitted, and the game system 14 is only used as an operation input device (that is, the game system 14 only transmits operation data, etc., to the game device 40). As will be described below with reference to FIG. 2, the handheld game device 10 included in the game system 14 has various operation switches, and outputs an operation input to the game device 40 when at least one switch is pressed by the player. The television 80 displays a video signal output from the game device 40 on a screen. The television 80 also has a built-in loud speaker for outputting audio signal output from the game device 40.

Figure 2:
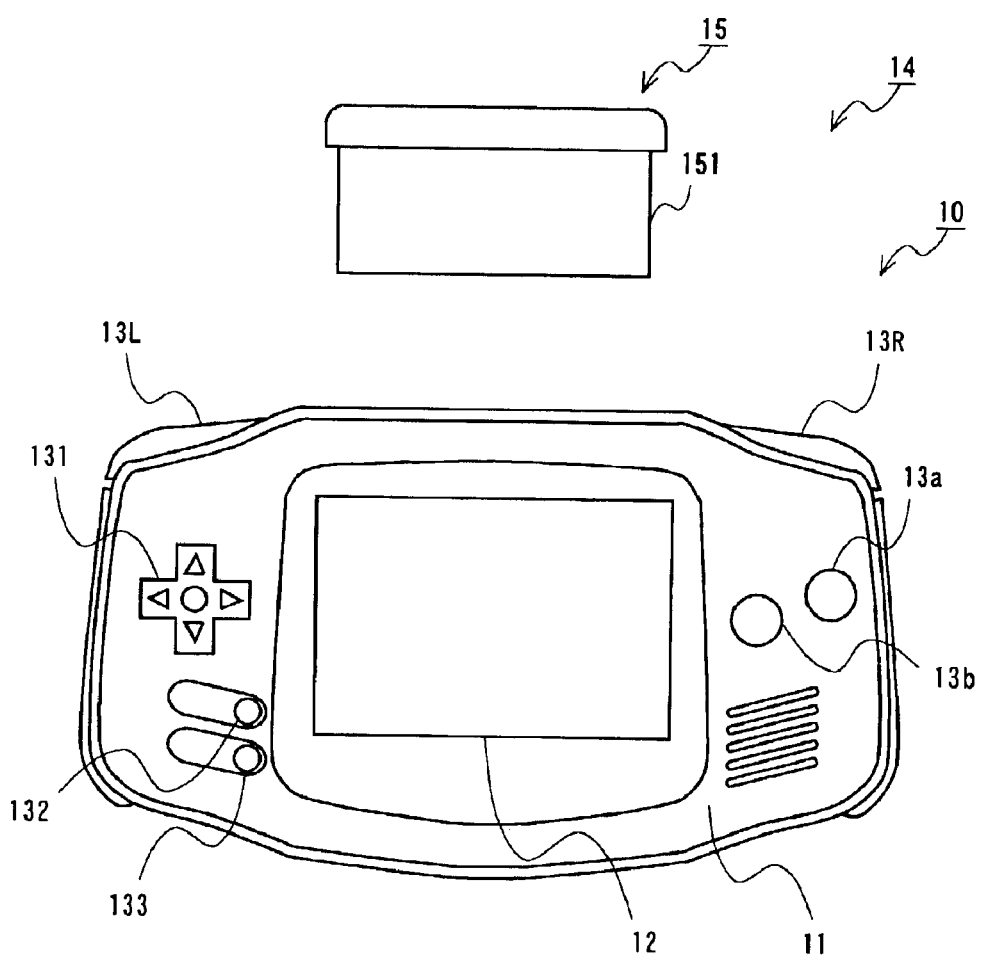
FIG. 2 is an external view of a game system 14.

FIG. 2 is an external view of the game system 14 included in the game system 30. The game system 14 is composed of the handheld game device 10 and a game cartridge 15. The handheld game device 10 includes a rectangular housing 11. The housing 11 has the liquid crystal display 12 (hereinafter, referred to as "the LCD 12") on one principal surface (front face), and a plurality of operation switches 13 provided on both sides of the LCD 12. The plurality of operation switches 13 are used by the player for inputting an operation signal for a game operation. A direction instruction switch 131, a start switch 132, and a select switch 133 are placed on the left side of the LCD 12, movement instruction switches 13a (A button) and 13b (B button) are placed on the right side of the LCD 12, and, if necessary, other movement instruction switches 13R and 13L are placed on the right and left ends of the upper side of the housing 11, respectively. The direction instruction switch 131 is used for instructing a moving direction of a game character. The movement instruction switches 13a and 13b are mainly used for instructing a movement (for example, jump, kick, or throw, etc.) of the game character. The start switch 132 is used for instructing a start of the game, and the select switch 133 is, for example, used for selecting a menu displayed on the screen.

Furthermore, the handheld game device 10 has a cartridge insertion slot (not shown) formed in the upper side thereof for removably inserting the game cartridge 15 (hereinafter, referred to as "the cartridge"), and a connector (see reference number 27 shown in FIG. 4) in the vicinity of the cartridge insertion slot. The cartridge 15 has a cartridge housing 151 including a semiconductor memory (a ROM 152, a RAM 153, and an acceleration sensor 154 shown in FIG. 4).

Figure 3:
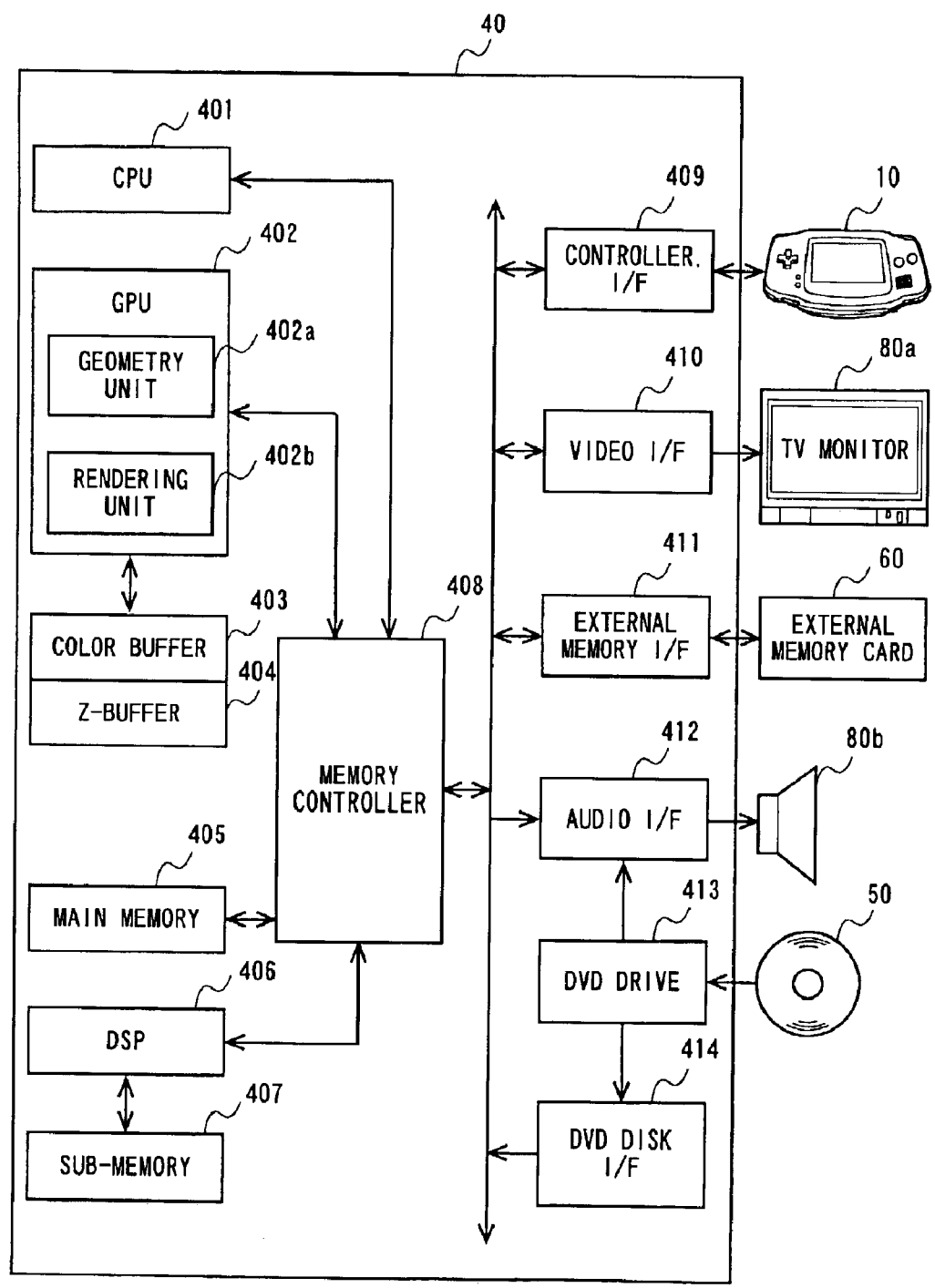
FIG. 3 is a block diagram of the game system 30.

FIG. 3 is a block diagram showing the hardware structure of the game system 30. In FIG. 3, the game device 40 includes a calculating section (a CPU 401, a graphics processing unit (GPU) 402, and a digital signal processor (DSP) 406), a storage section (a main memory 405, a color buffer 403, a Z-buffer 404, and a sub-memory 407), various interface (I/F) sections (409 to 412, and 414), a memory controller 408, and a DVD drive 413. As shown in FIG. 3, the memory controller 408 interconnects the calculating section, the storage section, and the interface sections, and controls data transfer between the components included in the above-described sections.

The DVD drive 413 reads the DVD-ROM 50 mounted on the game device 40. The DVD-ROM 50 stores the game program or various game data. The game program stored in the DVD-ROM 50 is loaded into the main memory 405 via a DVD disk I/F 414 and the memory controller 408. The CPU 401 executes the game program loaded into the main memory 405. During the game, the player operates the plurality of operation switches 13 of the handheld game device 10. The handheld game device 10 outputs an operation input in accordance with the above-described operation performed by the player to the game device 40 via the communication cable 70a. The operation input output from the handheld game device 10 is input into the CPU 401 via a controller I/F 409 and the memory controller 408. Based on the operation input from the handheld game device 10, the CPU 401 executes a predetermined game process. Similarly, an output from the acceleration sensor 154 included in the cartridge 15 inserted into the handheld game device 10 is also output to the game device 40 via the communication cable 70a, and input into the CPU 401.

The GPU 402 mainly generates image data in accordance with control from the CPU 401. The GPU 402 includes a geometry unit 402a and a rendering unit 402b, and is connected to a memory (the color buffer 403 and the Z-buffer 404) dedicated to image processing. Note that a portion of the main memory 405 may be allocated to image processing as a dedicated area in place of a memory dedicated to image processing. The geometry unit 402a and the rendering unit 402b are circuits for performing processing of three-dimensional computer graphics. The geometry unit 402a performs processing for determining a position (a position in a game space, which is represented by three-dimensional coordinates) of an object in a virtual three-dimensional space. The rendering unit 402b performs processing for generating a two-dimensional image to be displayed on the television 80 based on the three-dimensional coordinates obtained by the geometry unit 402a. The color buffer 403 stores the two-dimensional image generated by the rendering unit 402b, and the Z-buffer 404 stores information on depth of the three-dimensional computer graphics. With the above-described components, the GPU 402 generates image data to be displayed on the television 80, and outputs appropriately the generated image data to the television 80 via the memory controller 408 and a video I/F 410.

The DSP 406 mainly generates audio data in accordance with control from the CPU 401. The sub-memory 407 is a working memory of the DSP 406. The audio data generated by the DSP 406 is output to a loud speaker 80b of the television 80 via the memory controller 408 and an audio I/F 412. Note that the audio signal from the game device 40 may be output from a loud speaker that is not built into the television 80.

Figure 4:
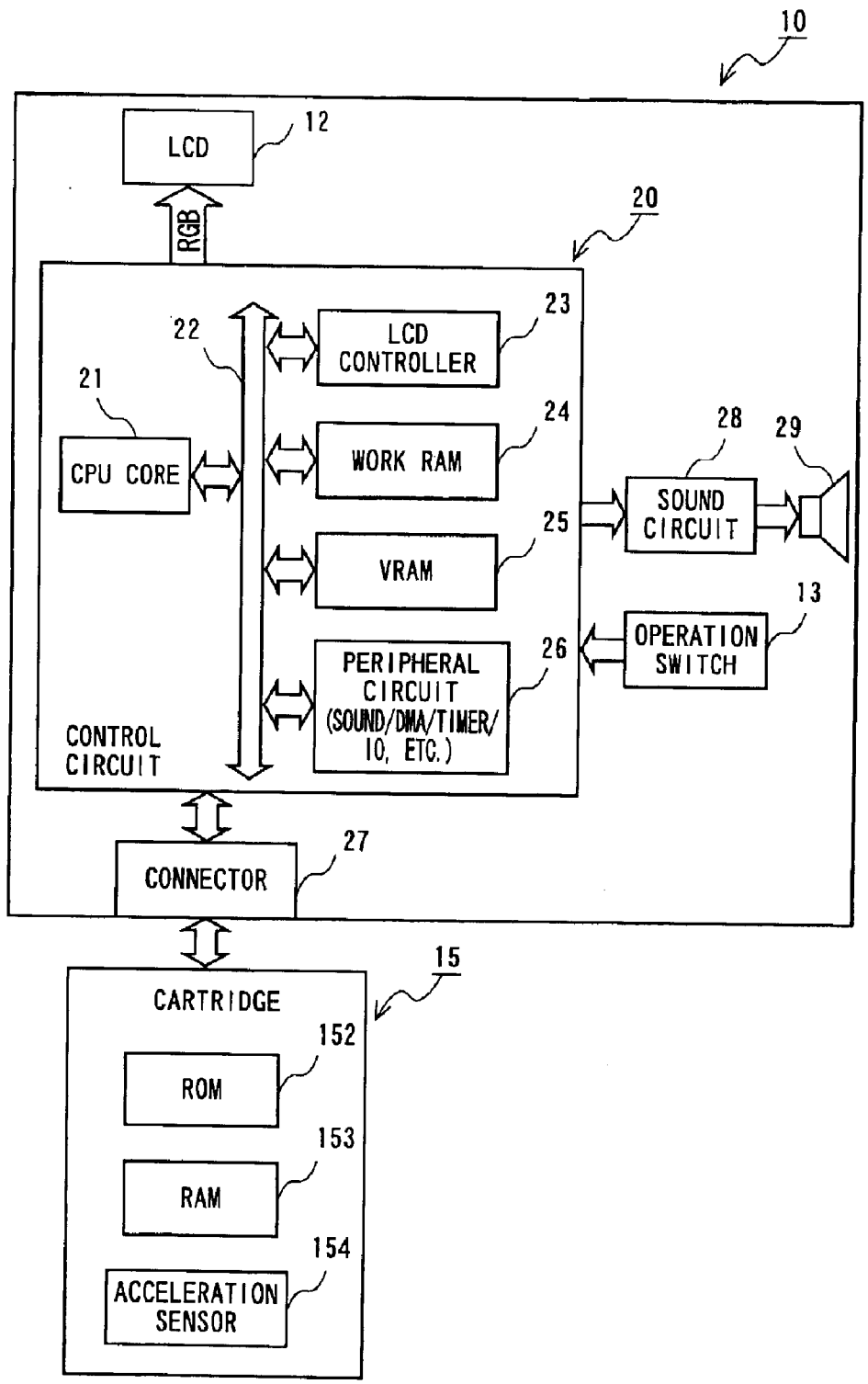
FIG. 4 is a block diagram of the game system 14.

FIG. 4 is a block diagram of the game system 14. The handheld game device 10 includes a control circuit 20 (for example, a CPU chip) having a CPU core 21. An LCD controller 23, a work RAM 24, a video RAM 25, and an interface circuit 26 are connected to the CPU core 21 via a bus 22 (an address bus and a data bus). The plurality of operation switches 13, a connector 27, and a sound circuit 28 are connected to the control circuit 20. A loud speaker 29 is connected to the sound circuit 28. A desired cartridge 15 is connected to the connector 27 as a preparation for starting a game. As a result, the player (user) is allowed to play his/her desired game by changing the cartridge 15.

The CPU core 21 of the control circuit 20 reads the game program from the cartridge 15 connected to the connector 27, executes a game process based on an operation signal, which is input from the plurality of operation switches 13, and the read program, causes the video RAM 24 to store data which is subjected to processing, and causes the video RAM 25 to temporally store the image data. The CPU core 21 supplies the image data to be displayed, which is temporally stored in the video RAM 25, to the LCD controller 23 according to predetermined display timing. The LCD controller 23 performs display control for causing the LCD 12 to display the image data supplied from the CPU core 21. The CPU core 21 also generates the sound data of imitative sound or music of the game based on the game program in accordance with the game progress, and supplies the generated sound data to the sound circuit 28. The sound circuit 28 including a D-A conversion circuit and an amplifier circuit converts the audio data into an audio signal (analog signal), and appropriately amplifies the converted signal for outputting from the loud speaker 29.

The game cartridge 15 includes a ROM 152, a RAM 153, and an acceleration sensor 154. As aforementioned, in the present embodiment, the game system 14 is used as a mere operation input device. That is, the handheld game device 10 only transmits the operation data to the game device 40. Thus, the ROM 152 stores a program used for transmitting the operation data to the game device 40. The RAM 153 is not used in the present embodiment.

Figure 5:
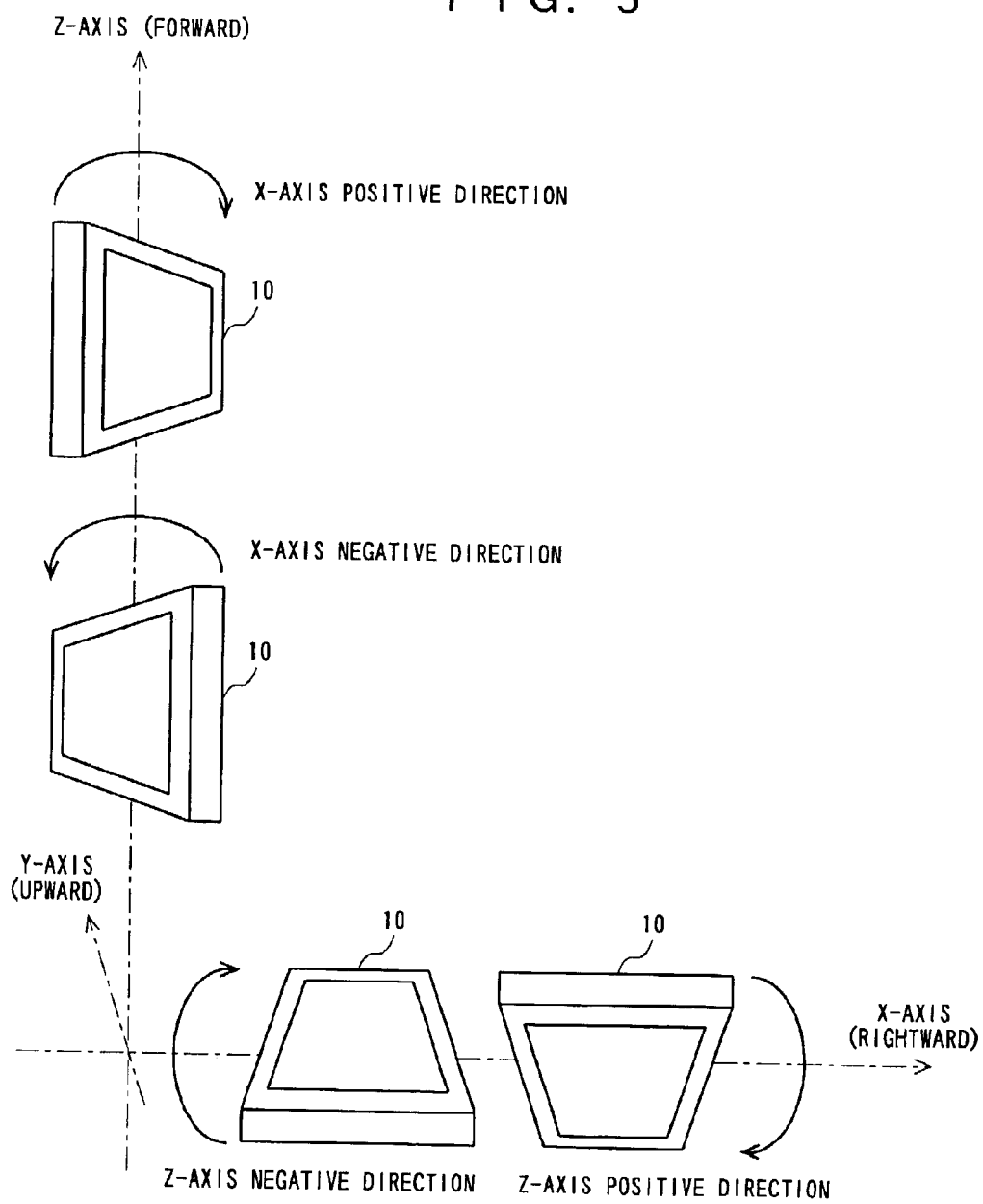
FIG. 5 is an illustration for defining X-, Y-, and Z-axes of a handheld game device 10.

The acceleration sensor 154 is a dual-axis acceleration sensor, and outputs the magnitudes of tilt in two directions, respectively, by detecting gravity. The acceleration sensor 154 is placed in the cartridge 15 so as to detect a tilt of the cartridge 15, which is shown in FIG. 2, tilted forward or backward, or to the right or left. The cartridge 15 is inserted into the handheld game device 10. As a result, the acceleration sensor 154 detects a tilt of the handheld game device 10, which is shown in FIG. 2, tilted forward or backward, or to the right or left. Referring to FIG. 5, when the handheld game device 10 is held horizontally, X-, Y-, and Z-axes thereof are defined as follows. That is, the X-axis is an axis in a left-to-right direction, the Z-axis is an axis in a forward direction, and the Y-axis is an axis in a vertical direction. The acceleration sensor 154 detects a tilt in the X-axis direction of the handheld game device 10 shown in FIG. 5 (that is, a tilt of the handheld game device 10 when it is rotated about the Z-axis) and a tilt in the Z-axis direction thereof (that is, a tilt of the handheld game device 10 when it is rotated about the X-axis). Note that, as shown in FIG. 5, in the case of being viewed from the far positive side of each axis, a positive direction rotation about each axis is assumed to be a rotation in the counterclockwise direction, and a negative direction rotation thereof is assumed to be a rotation in the clockwise direction. Also note that, in the following descriptions, the X-axis and the Z-axis shown in FIG. 5 may be simply referred to as "X-axis" and "Z-axis", respectively.

FIG. 6 is an illustration showing data stored in the DVD-ROM 50. The DVD-ROM 50 has a program storage area 50a storing the game program, a player object image data (including polygon data and texture data) storage area 50b, a non-player object image data storage area 50c, and an additional data (topographic object image data or various data used for the game program) storage area 50d. The program storage area 50a stores a program whose flow charts will be described below with reference to FIGS. 14 to 16. The player object image data storage area 50b stores image data (including polygon data and texture data) representing a player object. The non-player object image data storage area 50c stores image data (including polygon data and texture data) of respective non-player objects. The additional data storage area 50d stores additional various data (for example, topographic object data, audio data, etc.) used for the game program.

Figure 7:
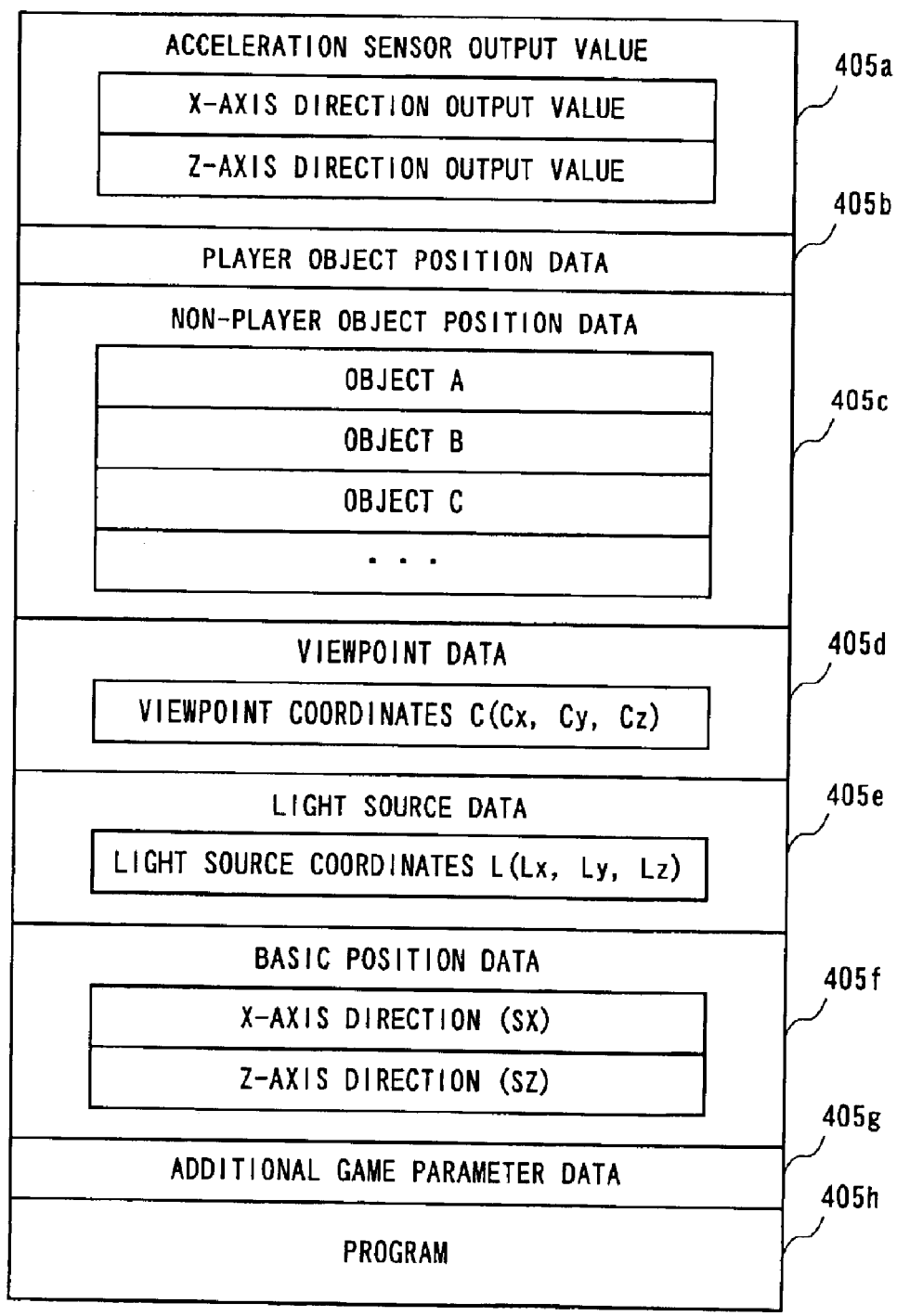
FIG. 7 is an illustration showing data stored in a main memory 405.

FIG. 7 is an illustration showing data stored in the main memory 405. The main memory 405 stores temporal data generated during the game process. An acceleration sensor output value storage area 405a stores an output value from the acceleration sensor 154, which is transferred from the handheld game device 10 to the game device 40. A player object position data storage area 405b stores position data (X, Y, Z in the world coordinate system) of the player object in the virtual game space. A non-player object position data storage area 405c stores position data (X, Y, Z in the world coordinate system) of the respective non-player objects. A viewpoint data storage area 405d stores viewpoint coordinates (Cx, Cy, Cz) used in three dimensional image processing. A light source data storage area 405e stores light source coordinates (Lx, Ly, Lz) used in the three dimensional image processing. A basic position data storage area 405f stores an X-axis direction output value and a Z-axis direction output value of the acceleration sensor 154, which are output when the handheld game device 10 is held in a basic position (a position in which a tilt of the handheld game device 10 is assumed to be 0 degrees) determined before the game is started. An additional game parameter data storage area 405g stores additional game parameter data (for example, vital power data or item data, etc., of the player character). A program storage area 405h stores transferred program data that has been read from the DVD-ROM 50.

Figure 8:
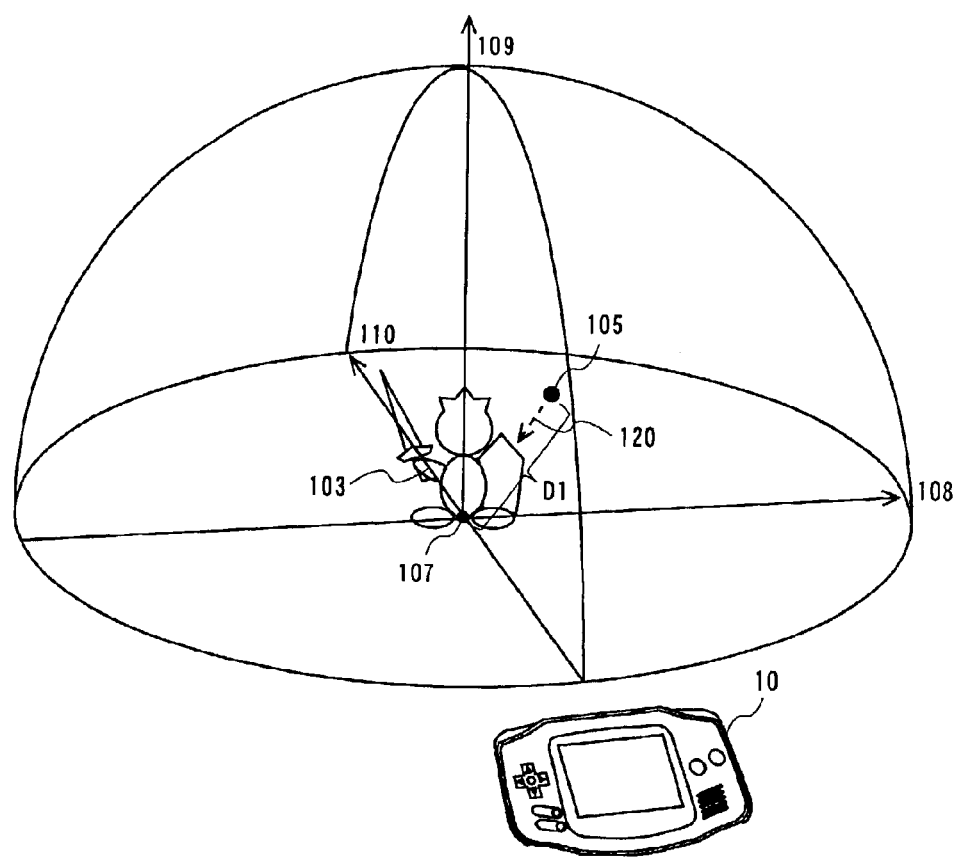
FIG. 8 is an illustration showing a predetermined range of a virtual game space centered on a player object 103.

FIGS. 8 to 13 are illustrations for describing rotation of the viewpoint coordinates in accordance with a tilt of the handheld game device 10. FIG. 8 is an illustration showing a predetermined range of the virtual game space centered on a player object 103. A point on the ground on which the player character 103 stands is determined as a sight point 107. Note that a position of the sight point is not limited to the position as described above. Viewpoint basic coordinates 105 are determined on a position at a predetermined distance (D1) from the sight point 107 in the Z-axis negative direction (a direction of an axis 111), which forms an angle of 45 degrees (toward the Y-axis positive direction) with the XZ plane, in a local coordinate system of the player object. Note that the above-described local coordinate system is a coordinate system in which an axis in a forward direction, an axis in an upward direction, and an axis in a rightward direction from the player object are assumed to be a Z-axis, a Y-axis, and an X-axis, respectively.

An axis 120 (shown in dotted line) is a Z-axis (an axis connecting a viewpoint and the sight point) of a viewpoint coordinate system. The axis 110 is the above-described Z-axis (axis 120) of the viewpoint coordinate system projected onto the XZ plane (horizontal plane) of the world coordinate system. An axis 108 on the XZ plane of the world coordinate system is an axis orthogonal to the axis 110 at the sight point. Also, an axis 109 is an axis orthogonal to the axes 108 and 110.

As described above, the viewpoint coordinates are on the Z-axis of the local coordinate system of the player object, that is, the viewpoint is placed just behind the player object. As a result, the axis 108 corresponds to the X-axis of the local coordinate system of the player object, the axis 109 corresponds to the Y-axis thereof, and the axis 110 corresponds to the Z-axis thereof.

Figure 9A:
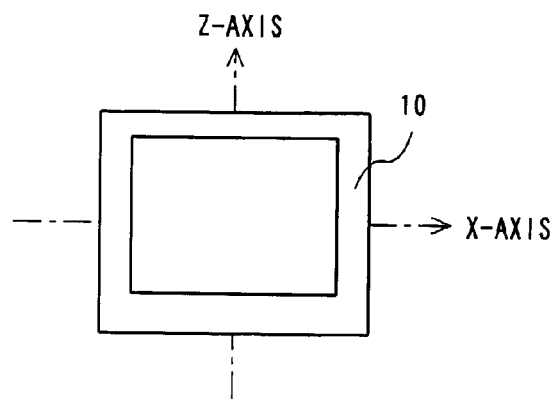
FIGS. 9A, 9B, and 9C are illustrations for describing a position of viewpoint coordinates in the case where the handheld game device 10 is held in a basic position.
Figure 9B:
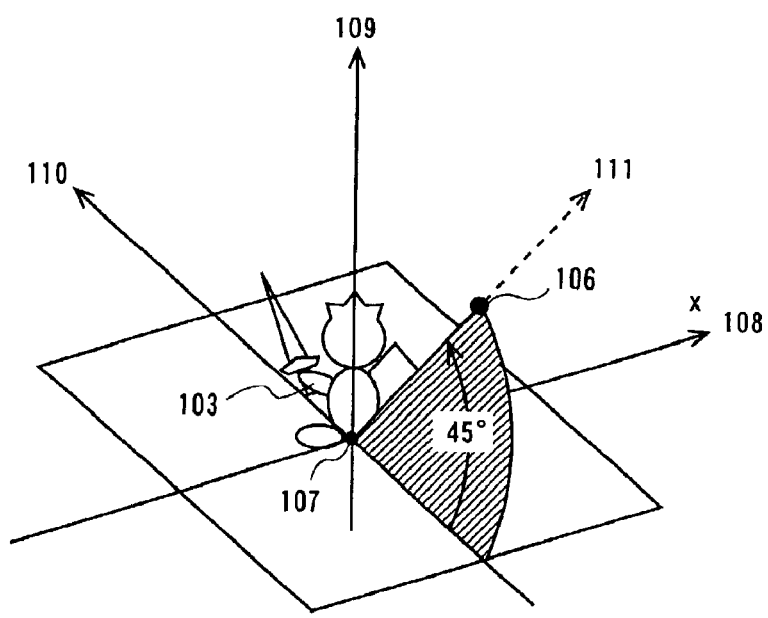
Figure 9C:
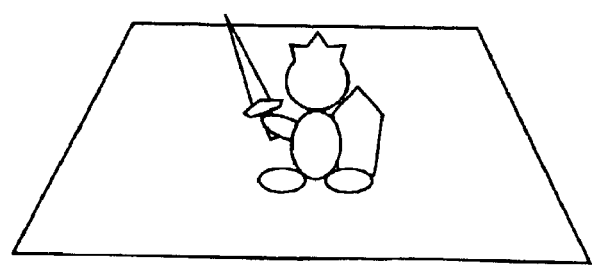

FIGS. 9A, 9B, and 9C are illustrations for describing a position of the viewpoint coordinates in the case where the handheld game device 10 is held in a basic position (see FIG. 9A. Note that, in the present embodiment, the basic position is assumed to be a position of the handheld game device 10 held horizontally). In this case, viewpoint coordinates 106 are determined on the same position as that of the basic viewpoint coordinates 105 (see FIG. 9B). Based on the viewpoint determined as described above, an image (the player object and the ground) as shown in FIG. 9C is displayed on the television 80.

Figure 10A:
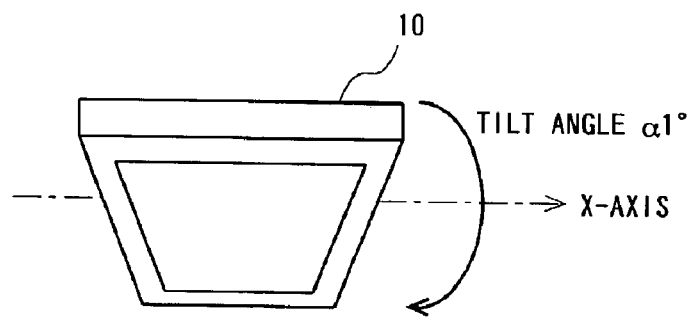
FIGS. 10A, 10B, and 10C are illustrations for describing rotation of the viewpoint coordinates in the case where the handheld game device 10 is tilted α1 degrees in a positive Z-axis direction from the basic position.
Figure 10B:
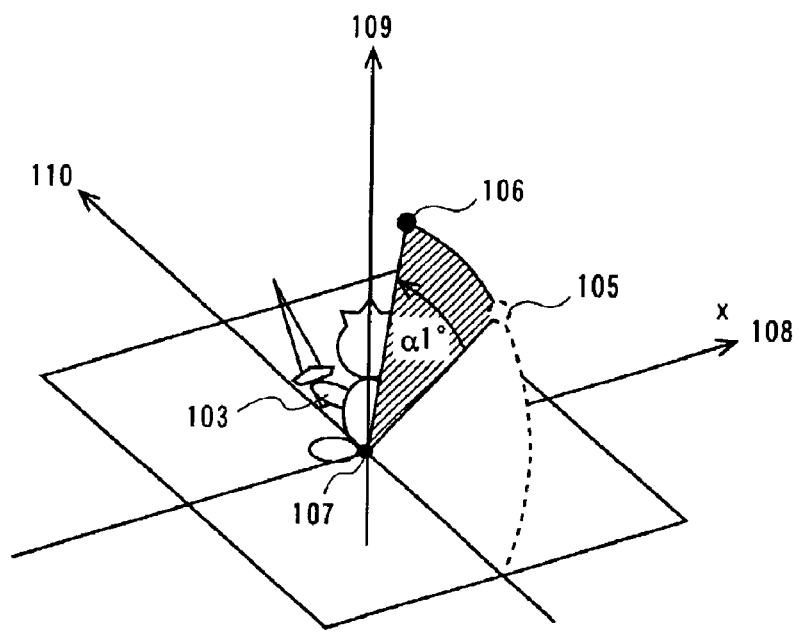
Figure 10C:
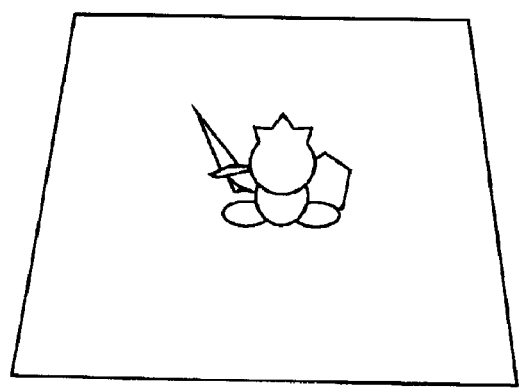

FIGS. 10A, 10B, and 10C are illustrations for describing rotation of the viewpoint coordinates in the case where the handheld game device 10 is tilted α1 degrees in a Z-axis positive direction from the basic position (see FIG. 10A). In this case, the basic viewpoint coordinates 105 rotated α1 degrees about the axis 108 in the direction opposite to the tilt direction are determined as the viewpoint coordinates 106 (see FIG. 10B). Based on the viewpoint determined as described above, an image shown in FIG. 10C is displayed on the television 80.

In the case where the handheld game device 10 is tilted in the Z-axis positive direction, the virtual game space appearing in the handheld game device 10 is displayed as if it is tilted in the Z-axis positive direction along with the handheld game device 10 by rotating the viewpoint coordinates in an opposite direction. Referring to FIGS. 10A, 10B, and 10C, when the handheld game device 10 held horizontally is tilted backward, the virtual game space is displayed as if it is tilted backward, in which the player object and the ground are looked down from on high. It is also possible to display the game space as if it is tilted by tilting the game space itself. In that case, however, data of the game space needs to be converted into tilted data, which requires considerably complicated processing. On the other hand, the present invention can represent a tilt of the game space by only rotating the viewpoint coordinates.

Figure 11A:
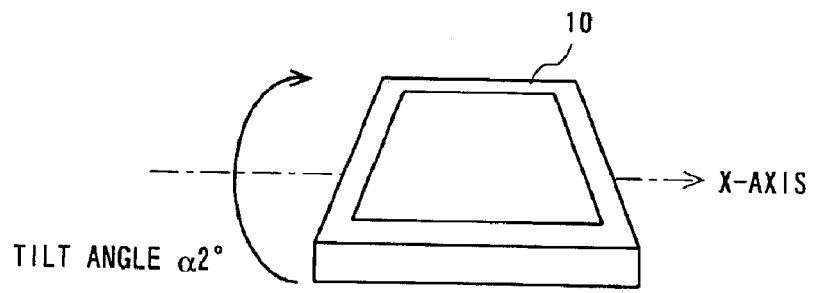
FIGS. 11A, 11B, and 11C are illustrations for describing rotation of the viewpoint coordinates in the case where the handheld game device 10 is tilted α2 degrees in a Z-axis negative direction from the basic position.
Figure 11B:
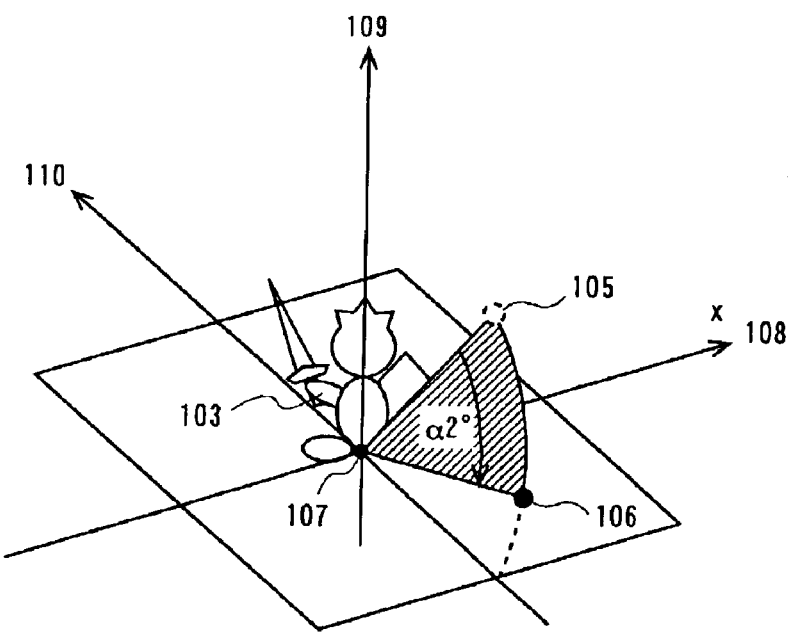
Figure 11C:
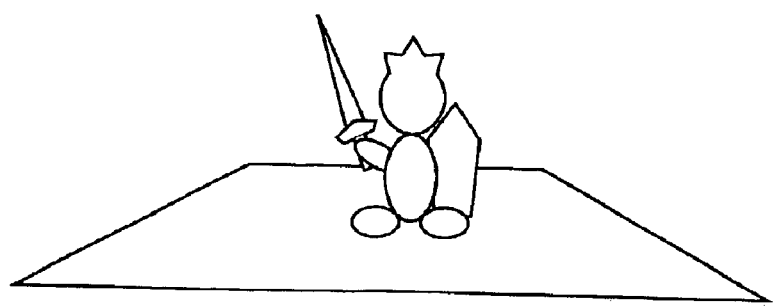

FIGS. 11A, 11B, and 11C are illustrations for describing rotation of the viewpoint coordinates in the case (see FIG. 11A) where the handheld game device 10 is tilted α2 degrees in the Z-axis negative direction from the basic position. In this case, the basic viewpoint coordinates 105 rotated α2 degrees about the axis 108 in the direction opposite to the tilt direction are determined as the viewpoint coordinates 106 (see FIG. 11B). Based on the viewpoint determined as described above, an image shown in FIG. 11C is displayed on the television 80. When the handheld game device 10 held horizontally is tilted forward, the virtual game space is displayed as if it is tilted forward, in which the player object and the ground are viewed from a position close to the ground.

Figure 12A:
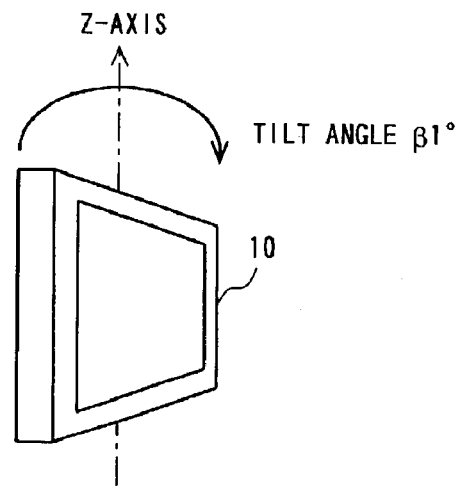
FIGS. 12A, 12B, and 12C are illustrations for describing rotation of the viewpoint coordinates in the case where the handheld game device 10 is tilted β1 degrees in an X-axis positive direction from the basic position.
Figure 12B:
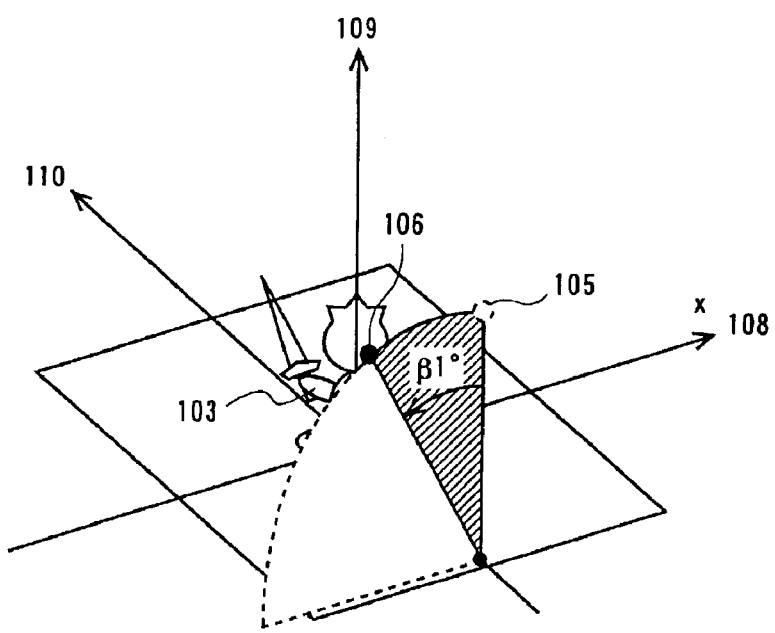
Figure 12C:
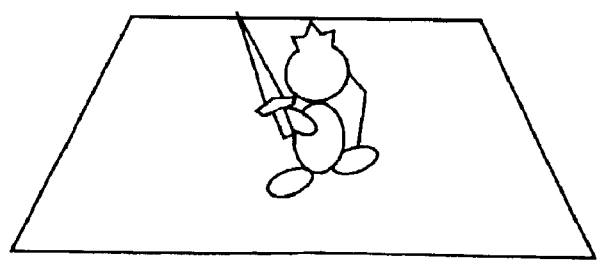

FIGS. 12A, 12B, and 12C are illustrations for describing rotation of the viewpoint coordinates in the case (see FIG. 12A) where the handheld game device 10 is tilted β1 degrees in an X-axis positive direction from the basic position. In this case, the basic viewpoint coordinates 105 rotated β1 degrees about the axis 110 in the direction opposite to the tilt direction are determined as the viewpoint coordinates 106 (see FIG. 12B). Based on the viewpoint determined as described above, an image shown in FIG. 12C is displayed on the television 80. When the handheld game device 10 held horizontally is tilted to the left, the virtual game space is displayed as if it is tilted to the left, in which the player object and the ground are viewed from the left.

Figure 13A:
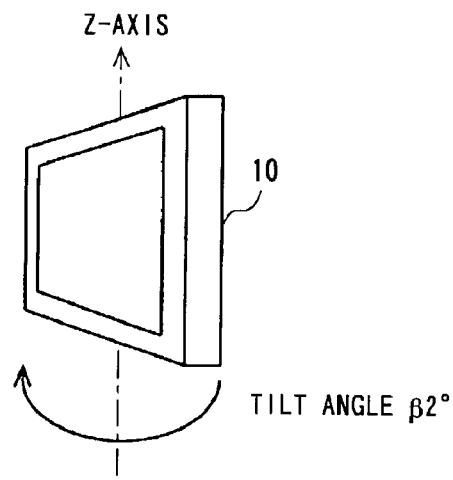
FIGS. 13A, 13B, and 13C are illustrations for describing rotation of the viewpoint coordinates in the case where the handheld game device 10 is tilted β2 degrees in an X-axis negative direction from the basic position.
Figure 13B:
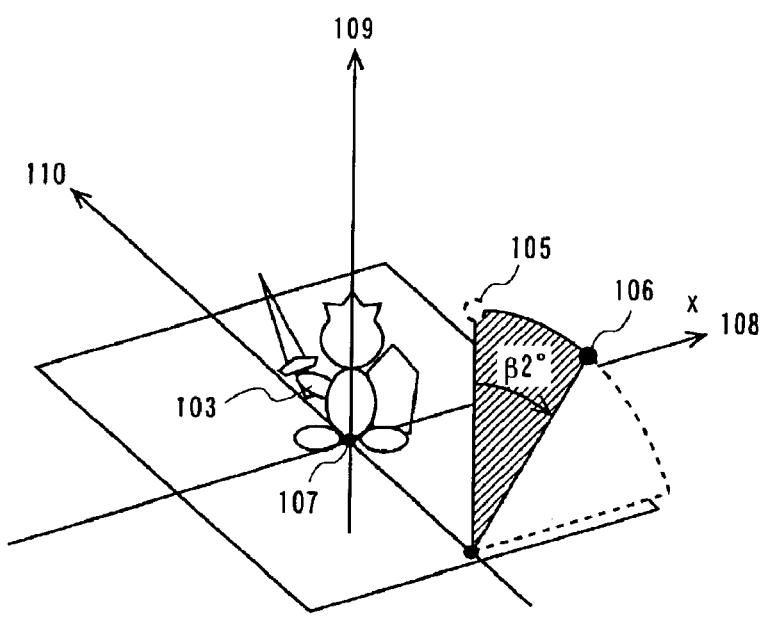
Figure 13C:
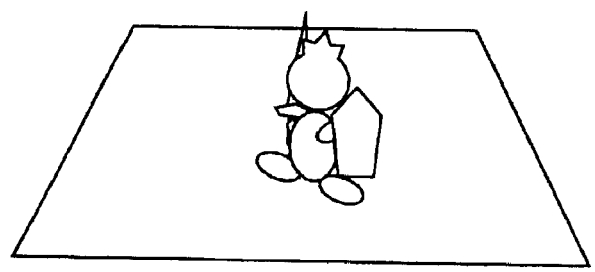

FIGS. 13A, 13B, and 13C are illustrations for describing rotation of the viewpoint coordinates in the case (see FIG. 13A) where the handheld game device 10 is tilted β2 degrees in an X-axis negative direction from the basic position. In this case, the basic viewpoint coordinates 105 rotated β2 degrees about the axis 110 in the direction opposite to the tilt direction are determined as the viewpoint coordinates 106 (see FIG. 13B). Based on the viewpoint determined as described above, an image shown in FIG. 13C is displayed on the television 80. When the handheld game device 10 held horizontally is tilted to the right, the virtual game space is displayed as if it is tilted to the right, in which the player object and the ground are viewed from the right.

Figure 14:
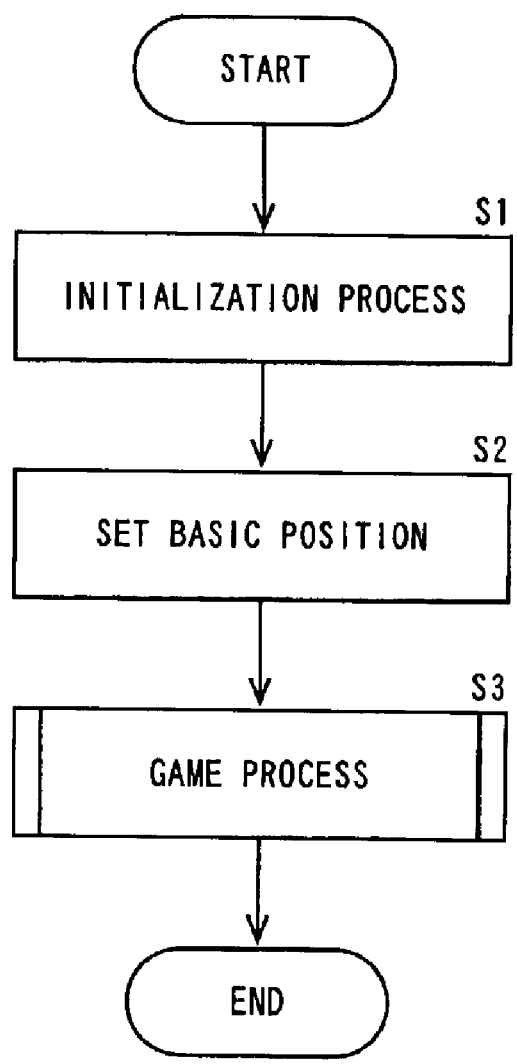
FIG. 14 is a flowchart showing a main flow.
Figure 15:
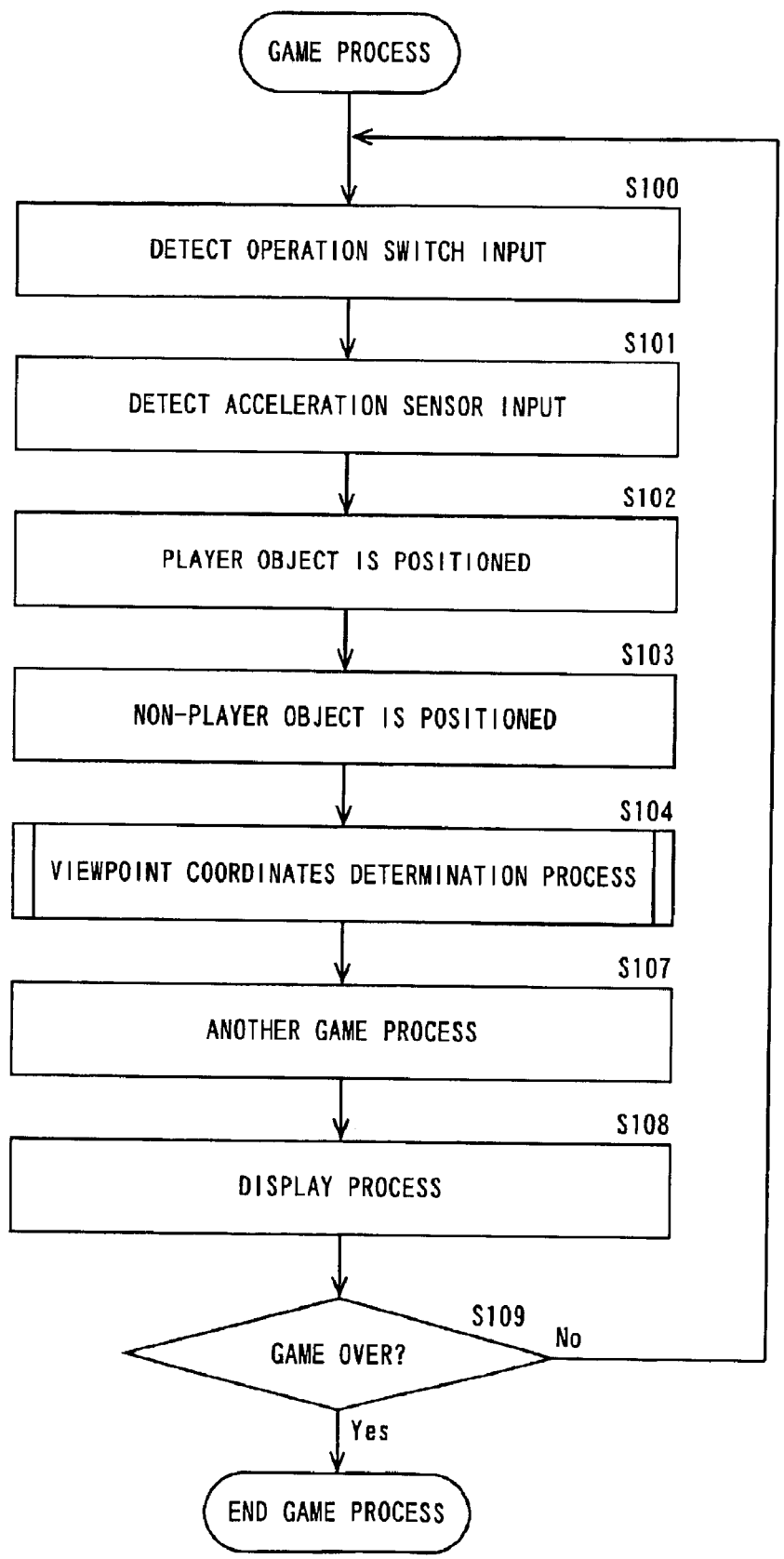
FIG. 15 is an illustration showing a flow of a game process.
Figure 16:
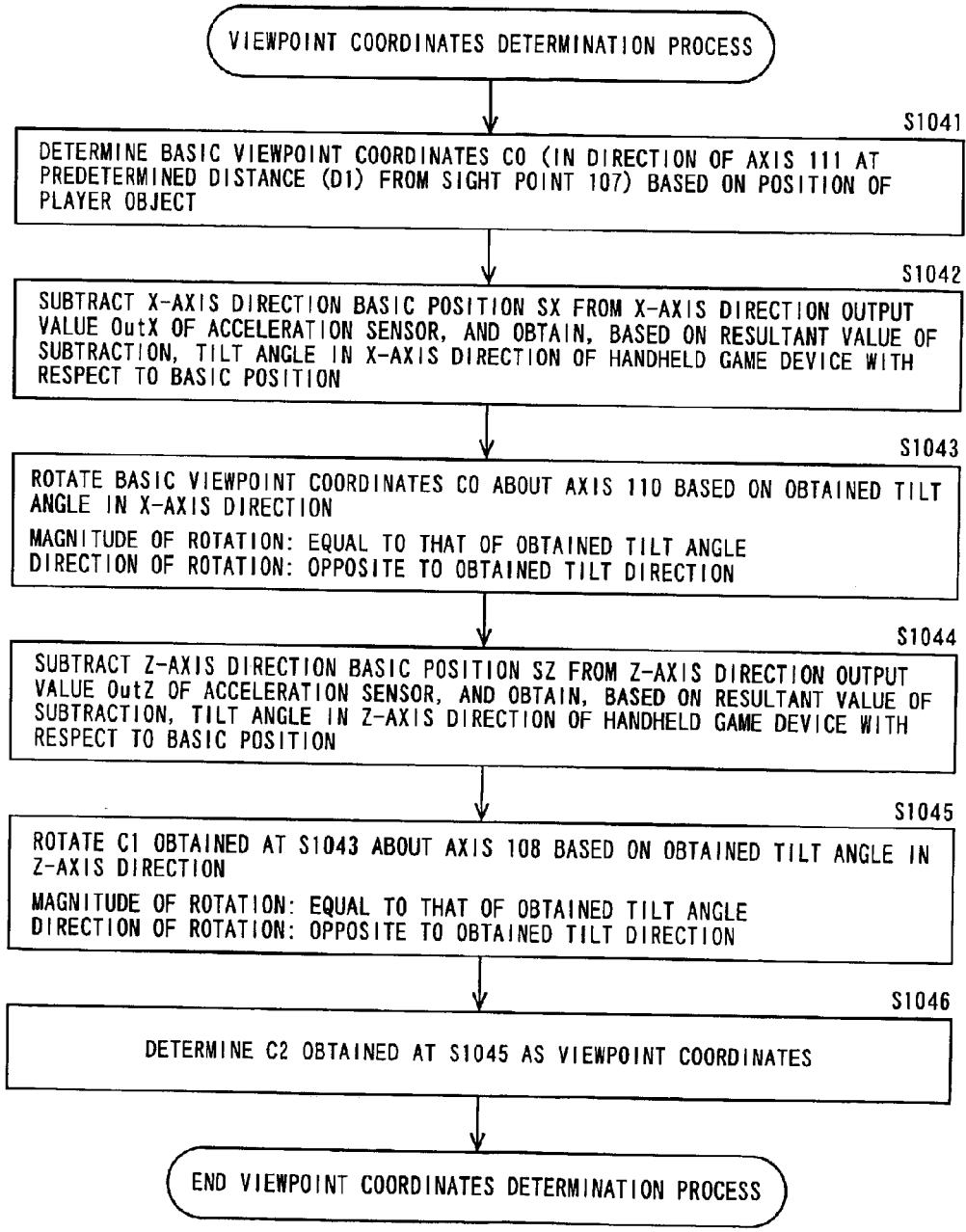
FIG. 16 is a flowchart showing a detailed viewpoint coordinates determination process.

FIGS. 14 to 16 are illustrations showing flowcharts of the program stored in the program storage area 50a of the DVD-ROM 50 and executed by the CPU 401.

FIG. 14 is an illustration showing a main flow. First, at step S, various game parameters are initialized. Then, at step S2, a basic position is determined. Specifically, the player holds the handheld game device 10 in his/her desired position, and operates a decision button (for example, the operation switch 13a). Then, output values (an X-axis direction output value and a Z-axis direction output value) from the acceleration sensor 154 at the time of operating the operation switch 13a are stored in the aforementioned basic position data storage area 405f shown in FIG. 7. After step S2, a game process is performed at step S3. The game process will be described in detail with reference to FIG. 15.

FIG. 15 is an illustration showing a flow of the game process. First, at step S100, an input from the operation switches 13 is detected. Note that the operation switches 13 are operated by the player for instructing, for example, a movement of the player object. After step S100, an input from the acceleration sensor is detected at step S101. Specifically, the X-axis direction output value and the Z-axis direction output value, which are output from the acceleration sensor 154 and transmitted from the handheld game device 10 to the game device 40 via the communication cable 70a, are stored in the aforementioned acceleration sensor output value storage area 405a shown in FIG. 7.

After step S101, the player object is positioned at step S102. Specifically, the player object is moved based on operation information of the operation switches detected in the operation switch input detecting process (S100), a position of the moved player object in the game space is determined, and the determined position is stored in the aforementioned player object position data storage area 405b shown in FIG. 7.

After step S102, a non-player object is positioned at step S103. Specifically, the non-player object is move based on a non-player object movement program included in the game program, a position of the moved non-player object in the game space is determined, and the determined position is stored in the aforementioned non-player object position data storage area 405*c* shown in FIG. 7.

After step S103, a viewpoint coordinates determination process is performed at step S104. This process will be described below with reference to FIG. 16. After step S104, another game process is performed at step S107. Specifically, for example, a process for a battle between the player object and the non-player object is performed.

After step S107, a display process is performed at step S108. Specifically, a game image is written into the color buffer 403 based on the data stored in the player object position data storage area 405*b* and the non-player object position data storage area 405*c* shown in FIG. 7, the viewpoint coordinates determined at step S104, and the processing results at step S106, etc. The above-described process is performed by the cooperation between the CPU 401 and the GPU 402.

FIG. 16 is a flowchart showing a detailed viewpoint coordinates determination process at step S104 shown in FIG. 15. First, basic viewpoint coordinates C0 are determined at step S1041. That is, a position at a predetermined distance (D1) from the sight point 107 in the direction of the axis 111 is determined as the basic viewpoint coordinates C0.

After step S1041, an X-axis direction basic position SX is subtracted at step S1042 from an X-axis direction output value OutX of the acceleration sensor. Based on the resultant value of the subtraction, a tilt angle in the X-axis direction and a tilt direction of the handheld game device 10 with respect to the basic position are obtained (the tilt angle is obtained based on the magnitude of the resultant value, and the tilt direction is obtained based on the sign (plus or minus) of the resultant value).

After step S1042, the basic viewpoint coordinates C0 are rotated at step S1043 about the axis 110 based on the tilt angle in the X-axis direction obtained at step S1042 (the rotated coordinates are assumed to be C1). Specifically, the basic viewpoint coordinates C0 are rotated at the tilt angle obtained at step S1042 in the direction opposite to the tilt direction obtained at step S1042.

After step S1043, a Z-axis direction basic position SZ is subtracted at step S1044 from the Z-axis direction output value OutZ of the acceleration sensor. Based on the resultant value of the subtraction, a tilt angle in the Z-axis direction and a tilt direction of the handheld game device 10 with respect to the basic position are obtained (the tilt angle is obtained based on the magnitude of the resultant value, and the tilt direction is obtained based on the sign (plus or minus) of the resultant value).

After step S1044, the rotated coordinates C1 obtained at step S1043 are rotated about the axis 108 based on the tilt angle in the Z-axis direction obtained at step S1044 (the rotated coordinates are assumed to be C2) Specifically, the C1 are rotated at the tilt angle obtained at step S1044 in the direction opposite to the tilt direction obtained at step S1044.

After step S1045, the C2 obtained at step S1045 are determined at step S1046 as the viewpoint coordinates. Specifically, the determined viewpoint coordinates are stored in the aforementioned viewpoint data storage area 405*d* shown in FIG. 7. After step S1046, the viewpoint coordinates determination process is ended.

In the above-described embodiment, a method for determining a rotation axis ("a predetermined axis" in claim 2 or claim 9) of viewpoint has different variants as follows. In a first variant, when the tilt sensor detects that the housing is tilted to the right or the left, the Z-axis of the local coordinate system of the player object is assumed to be a predetermined axis, and the viewpoint is rotated about the above-described predetermined axis. Also, when the tilt sensor detects that the housing is tilted forward or backward, the viewpoint is rotated about the X-axis of the local coordinate system of the player object. In the above-described embodiment, the Z-axis (the axis 120) of the viewpoint coordinate system is projected onto the XZ plane of the world coordinate system, and the projected axis (the axis 110) is determined as the predetermined axis. Otherwise, in a second variant, the Z-axis itself of the viewpoint coordinate system is assumed to be the predetermined axis. Similarly, in a third variant, the Z-axis of the viewpoint coordinate system is projected onto an XZ plane of a local coordinate system of an object (for example, a player object), and the projected axis is assumed to be the predetermined axis. Also, the Z-axis of the viewpoint coordinate system is projected onto a topographic object (a ground object on which the player object is placed), and the projected axis is assumed to be the predetermined axis.

Figure 17:
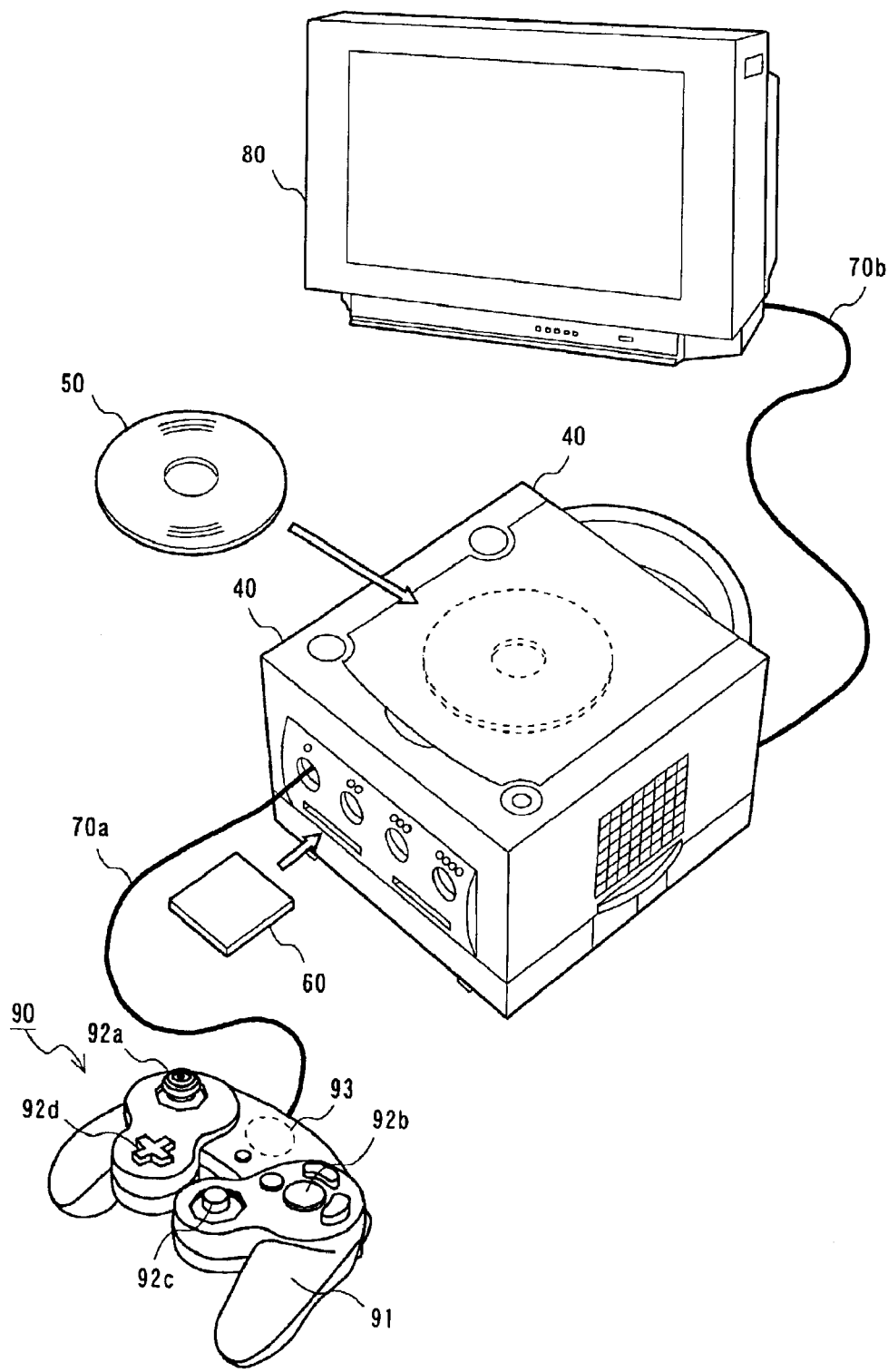
FIG. 17 is a view showing an exemplary variant of the present invention.

FIG. 17 is a view showing an exemplary variant of the present invention. This variant differs from the above-described embodiment in that an operation device operated by the player is a controller 90 in place of the game system 14. The controller 90 includes a housing 91 and operation switches 92*a* to 92*d*. The controller 90 also includes an acceleration sensor 93 in the housing 90. Thus, when the controller 90 is held and tilted by the player, a value corresponding to a tilt of the controller 90 is output to the game device 40. The same process as that of the above-described embodiment is performed in this variant. Thus, the description thereof is omitted.

While the invention has been described in detail, the foregoing description is in all aspects illustrative and not restrictive. It is understood that numerous other modifications and variations can be devised without departing from the scope of the invention.

What is claimed is:

1. A game system displaying a three-dimensional game space on a display, comprising:
    a housing held by a player;
    a tilt sensor provided on the housing for generating output signals;
    the display provided on the housing;
    a viewpoint coordinates determination mechanism for determining coordinates of a viewpoint to be set in the game space in accordance with an output signal from the tilt sensor; and
    a game image generation processing mechanism for generating a game image indicating a three dimensional game space in which a sight point set in the game space is seen from the viewpoint based on the viewpoint coordinates determined by the viewpoint coordinates determination mechanism;
    wherein the viewpoint coordinates determination mechanism rotates the viewpoint about the sight point such that the three dimensional game space displayed on the display is tilted forward in conjunction with the housing when it is detected that the housing is tilted forward based on the output signal from the tilt sensor; and
    wherein the viewpoint coordinates determination mechanism rotates the viewpoint about the sight point such that the three dimensional game space displayed on the display is tilted backward in conjunction with the housing when it is detected that the housing is tilted backward based on the output signal from the tilt sensor.

2. The game system according to claim 1, wherein the viewpoint coordinates determination mechanism detects that the housing is tilted forward or backward based on the output signal from the tilt sensor, and rotates the viewpoint about the sight point in a direction opposite to the tilt direction of the housing.

3. The game system according to claim 1, wherein the viewpoint coordinates determination mechanism detects a tilt angle of the housing tilting forward or backward from a basic position of the housing based on the output signal from the tilt sensor, and rotates the viewpoint about the sight point from previously determined basic viewpoint coordinates by a same angle as the detected tilt angle of the housing.

4. The game system according to claim 1, wherein the viewpoint coordinates determination mechanism rotates the viewpoint about a central axis which is a straight line segment orthogonal to a line segment connecting the viewpoint and the sight point at the sight point and included in a horizontal plane including the sight point in the game space, when it is detected that the housing is tilted forward or backward based on the output signal from the tilt sensor.

5. The game system according to claim 4, wherein the viewpoint coordinates determination mechanism detects a tilt angle of the housing tilting forward or backward from a basic position of the housing based on the output signal from the tilt sensor, and rotates the viewpoint about the central axis from previously determined basic viewpoint coordinates by a same angle as the detected tilt angle of the housing.

6. The game system according to claim 1,
wherein the viewpoint coordinates determination mechanism rotates the viewpoint about a rotation center, which is obtained by projecting previously determined basic viewpoint coordinates perpendicularly onto a horizontal plane including the sight point in the game space, such that the game space displayed on the display is displayed in conjunction with the housing so as to be tilted to the right when it is detected that the housing is tilted to the right based on the output signal from the tilt sensor, and
the viewpoint coordinates determination mechanism rotates the viewpoint about the rotation center such that the game space displayed on the display is displayed in conjunction with the housing so as to be tilted to the left when it is detected that the housing is tilted to the left based on the output signal from the tilt sensor.

7. The game system according to claim 6, wherein the viewpoint coordinates determination mechanism detects that the housing is tilted to the right or left based on the output signal from the tilt sensor, and rotates the viewpoint about the rotation center in a direction opposite to the tilt direction of the housing.

8. The game system according to claim 6, wherein the viewpoint coordinates determination mechanism detects a tilt angle of the housing tilting to the right or left from a basic position of the housing based on the output signal from the tilt sensor, and rotates the viewpoint about the rotation center by a same angle as the detected tilt angle of the housing.

9. A memory medium encoded with a game program executed in a game system for displaying a three dimensional game space on a display, the game system comprising a housing held by a player and a tilt sensor provided on the housing, the game program causing the game system to execute the steps of:
a viewpoint coordinates determining step of determining coordinates of a viewpoint to be set in the game space in accordance with an output signal from the tilt sensor; and a game image generating step of generating a game image indicating a game space in which a sight point set in the three dimensional game space is seen from the viewpoint based on the viewpoint coordinates determined by the viewpoint coordinates determination step,
wherein the viewpoint coordinates determination step rotates the viewpoint about the sight point such that the three dimensional game space displayed on the display is tilted forward in conjunction with the housing when it is detected that the housing is tilted forward based on the output signal from the tilt sensor, and
the viewpoint coordinates determination step rotates the viewpoint about the sight point such that the three dimensional game space displayed on the display is tilted backward in conjunction with the housing when it is detected that the housing is tilted backward based on the output signal from the tilt sensor.

10. The memory medium according to claim 9, the viewpoint coordinates determination step detects that the housing is tilted forward or backward based on the output signal from the tilt sensor, and rotates the viewpoint about the sight point in a direction opposite to the tilt direction of the housing.

11. The memory medium according to claim 9, wherein the viewpoint coordinates determination step detects a tilt angle of the housing tilting forward or backward from a basic position of the housing based on the output signal from the tilt sensor, and rotates the viewpoint about the sight point from previously determined basic viewpoint coordinates by a same angle as the detected tilt angle of the housing.

12. The memory medium according to claim 9, wherein the viewpoint coordinates determination step rotates the viewpoint about a central axis, which is a straight line segment orthogonal to a line segment connecting the viewpoint and the sight point at the sight point and included in a horizontal plane including the sight point in the game space, when it is detected that the housing is tilted forward or backward based on the output signal from the tilt sensor.

13. The memory medium according to claim 12, wherein the viewpoint coordinates determination step detects a tilt angle of the housing tilting forward or backward from a basic position of the housing based on the output signal from the tilt sensor, and rotates the viewpoint about the central axis from previously determined basic viewpoint coordinates by a same angle as the detected tilt angle of the housing.

14. The memory medium according to claim 9,
wherein the viewpoint coordinates determination step rotates the viewpoint about a rotation center, which is obtained by projecting previously determined basic viewpoint coordinates perpendicularly onto a horizontal plane including the sight point in the game space, such that the game space displayed on the display is displayed in conjunction with the housing so as to be tilted to the right when it is detected that the housing is tilted to the right based on the output signal from the tilt sensor, and
the viewpoint coordinates determination step rotates the viewpoint about the rotation center such that the game space displayed on the display is displayed in conjunction with the housing so as to be tilted to the left when it is detected that the housing is tilted to the left based on the output signal from the tilt sensor.

15. The memory medium according to claim 14, wherein the viewpoint coordinates determination step detects that the housing is tilted to the right or left based on the output signal from the tilt sensor, and rotates the viewpoint about the rotation center in a direction opposite to the tilt direction of the housing.

16. The memory medium according to claim 14, wherein the viewpoint coordinates determination step detects a tilt angle of the housing tilting to the right or left from a basic position of the housing based on the output signal from the tilt sensor, and rotates the viewpoint about the rotation center by a same angle as the detected tilt angle of the housing.

17. A memory medium encoded with a program for execution in an information processing system for displaying a three-dimensional space on a display, the information system including a housing held by a player and a tilt sensor associated with the housing for generating output signals, the program causing the information processing system to perform the operations of:

determining coordinates of a viewpoint to be set in the three dimensional space in accordance with an output signal of the tilt sensor;

generating a display of an image indicating a three dimensional space in which a sight point in the space is seen from the viewpoint having first coordinates;

rotating the viewpoint about the sight point to different coordinates upon detection by the tilt sensor of the housing being tilted forward, and generating a display of an image indicating a three-dimensional space in which a sight point in the three-dimensional space is seen from the viewpoint at the different coordinates such that the displayed space is tilted forward; and rotating the viewpoint about the sight point to different coordinates upon detection by the tilt sensor of the housing being tilted backward, and generating a display of an image indicating a three-dimensional space in which a sight point in the three-dimensional space is seen from the viewpoint at the different coordinates such that the displayed three-dimensional space is tilted backward.

18. The memory medium according to claim 17, wherein rotating the viewpoint about the sight point upon detection of the housing being tilted forward or backward comprises rotating the viewpoint about the sight point in a direction opposite to the tilt direction of the housing.

19. The memory medium according to claim 17, wherein rotating the viewpoint about the sight point upon detection of the housing being tilted forward or backward comprises rotating the viewpoint about the sight point from previously determined viewpoint coordinates by a same angle amount as the detected tilt angle of the housing.

20. The memory medium according to claim 17, wherein rotating the viewpoint about the sight point upon detection of the housing being tilted forward or backward comprises rotating the viewpoint about a central axis, which is a straight line segment orthogonal to a line segment connecting the viewpoint and the sight point at the sight point and included in a horizontal plane including the sight point in the thee-dimensional space.

21. The memory medium according to claim 17, further comprising rotating the viewpoint about a rotation center, which is obtained by projecting previously determined viewpoint coordinates perpendicularly onto a horizontal plane including the sight point in the three-dimensional space, and generating a display of an image indicating the three-dimensional space so as to be tilted to the right when it is detected that the housing is tilted to the right based on the output signal from the tilt sensor, and rotating the viewpoint about the rotation center and generating a display of an image indicating the three dimensional space so as to be tilted to the left when it is detected that the housing is tilted to the left based on the output signal from the tilt sensor.

22. The memory medium according to claim 21, wherein the housing being tilted to the right or left is determined based on the output signal from the tilt sensor, and rotating the viewpoint about the rotation center comprises rotating the viewpoint about the rotation center in a direction opposite to the tilt direction of the housing.

23. The memory medium according to claim 21, wherein determining that the housing is tilted includes determining that the housing is being tilted to the right or left from a basic position of the housing based on the output signal from the tilt sensor, and rotating the viewpoint about the rotation center to the left or right comprises rotating the viewpoint about the rotation center by a same angle as the detected tilt angle of the housing.

24. An information processing system for displaying a three-dimensional space on a display, comprising:

a housing held by a player;

a tilt sensor provided on the housing for generating output signals;

a viewpoint coordinates determination mechanism for determining coordinates of a viewpoint to be set in the three-dimensional space in accordance with an output signal from the tilt sensor; and an image generation processing mechanism for generating an image indicating a three-dimensional space in which a sight point set in the three-dimensional space is seen from the viewpoint based on the viewpoint coordinates determined by the viewpoint coordinates determination mechanism;

wherein the viewpoint coordinates determination mechanism rotates the viewpoint about the sight point such that the three-dimensional space displayed on the display is tilted forward when the output signal from the tilt sensor indicates that the housing is being tilted forward, and wherein the viewpoint coordinates determination mechanism rotates the viewpoint about the sight point such that the three-dimensional space displayed on the display is tilted backward when the output signal from the tilt sensor indicates that the housing is being tilted backward.

25. An information processing system according to claim 24, wherein the viewpoint coordinates determination mechanism detects that the housing is tilted forward or backward based on the output signal from the tilt sensor, and rotates the viewpoint about the sight point in a direction opposite to the tilt direction of the housing.

26. An information processing system according to claim 24, wherein the viewpoint coordinates determination mechanism detects a tilt angle of the housing tilting forward or backward from a basic position of the housing based on the output signal from the tilt sensor, and rotates the viewpoint about the sight point from previously determined basic viewpoint coordinates by a same angle as the detected tilt angle of the housing.

27. An information processing system according to claim 26, wherein the viewpoint coordinates determination mechanism detects a tilt angle of the housing tilting forward or backward from a basic position of the housing based on the output signal from the tilt sensor, and rotates the viewpoint about the central axis from previously determined basic viewpoint coordinates by a same angle as the detected tilt angle of the housing.

28. An information processing system according to claim 24, wherein the viewpoint coordinates determination mechanism rotates the viewpoint about a central axis, which is a straight line segment orthogonal to a line segment connecting the viewpoint and the sight point at the sight point and included in a horizontal plane including the sight point in the three-dimensional space, when it is detected that the housing is tilted forward or backward based on the output signal from the tilt sensor.

29. An information processing system according to claim 24,
wherein the viewpoint coordinates determination mechanism rotates the viewpoint about a rotation center, which is obtained by projecting previously determined basic viewpoint coordinates perpendicularly onto a horizontal plane including the sight point in the three-dimensional space, such that the three-dimensional space displayed on the display is displayed in conjunction with the housing so as to be tilted to the right when it is detected that the housing is tilted to the right based on the output signal from the tilt sensor, and the viewpoint coordinates determination mechanism rotates the viewpoint about the rotation center such that the three-dimensional space displayed on the display is displayed in conjunction with the housing so as to be tilted to the left when it is detected that the housing is tilted to the left based on the output signal from the tilt sensor.

30. An information processing system according to claim 29, wherein the viewpoint coordinates determination mechanism detects that the housing is tilted to the right or left based on the output signal from the tilt sensor, and rotates the viewpoint about the rotation center in a direction opposite to the tilt direction of the housing.

31. An information processing system according to claim 29, wherein the viewpoint coordinates determination mechanism detects a tilt angle of the housing tilting to the right or left from a basic position of the housing based on the output signal from the tilt sensor, and rotates the viewpoint about the rotation center by a same angle as the detected tilt angle of the housing.

* * * * *